United States Patent [19]

Fujinami et al.

[11] Patent Number: 5,504,585
[45] Date of Patent: Apr. 2, 1996

[54] APPARATUS AND METHOD FOR PROVIDING PLURAL PICTURES WHILE SEARCHING A RECORDING MEDIUM WHEREON A COMPRESSED PICTURE SIGNAL IS RECORDED

[75] Inventors: Yasushi Fujinami, Kanagawa; Markus H. Veltman, Tokyo, both of Japan

[73] Assignee: Sony Corporation, Japan

[21] Appl. No.: 125,685

[22] Filed: Sep. 22, 1993

[30] Foreign Application Priority Data

Sep. 22, 1992 [JP] Japan ..................................... 4-277956
Dec. 18, 1992 [JP] Japan ..................................... 4-355558

[51] Int. Cl.$^6$ ............................... H04N 5/76; H04N 5/78
[52] U.S. Cl. ............................................. 358/335; 360/10.1
[58] Field of Search ................................... 358/335, 342, 358/310, 312; 360/10.1, 32; 348/384, 394; H04N 5/92

[56] References Cited

U.S. PATENT DOCUMENTS 5,140,437  8/1992  Yonemitsu et al. ..................... 358/342
5,305,113  4/1994  Iwamura et al. ........................ 358/312

FOREIGN PATENT DOCUMENTS 0505985  9/1992  European Pat. Off. ......... H04N 5/92

Primary Examiner—Tommy P. Chin
Assistant Examiner—Robert Chevalier
Attorney, Agent, or Firm—Limbach & Limbach; Ian Hardcastle

[57] ABSTRACT

A method and apparatus for reproducing pictures from a recording medium in search mode wherein each picture is recorded in the recording medium in the form of a coded signal. The coded signal is coded in either an intra-picture coding mode or an inter-picture coding mode. The coded signal of a picture coded in the intra-picture coding mode is an I-picture; the coded signal of a picture coded in the inter-picture coding mode with only forward prediction is a P-picture; and the coded signal of a picture coded in the inter-picture coding mode with bidirectional prediction is a B-picture. The pictures are reproduced from a read position on the recording medium. To provide an increased number of pictures in search mode, the read position is changed to a first read position, and an I-picture is immediately reproduced from the recording medium at the first read position. Then, at least one B-picture or one P-picture is immediately reproduced from the recording medium following the I-picture. Finally, the I-picture and the at least one B-picture or P-picture is decoded to provide an output signal for display.

20 Claims, 20 Drawing Sheets

FIG. 4
PRIOR ART

STREAM_ID TABLE

| STREAM ID | STREAM TYPE |
|---|---|
| 1011 1100 | RESERVED STREAM |
| 1011 1101 | PRIVATE_STREAM_1 |
| 1011 1110 | PADDING STREAM |
| 1011 1111 | PRIVATE_STREAM_2 |
| 110x xxxx | AUDIO STREAM-NUMBER xxxx |
| 1110 xxxx | VIDEO STREAM-NUMBER xxxx |
| 1111 xxxx | RESERVED DATA STREAM-NUMBER xxxx |

FIG. 9
PRIOR ART

| ENTRY | |
|---|---|
| #0 | SECTOR ADDRESS OF ENTRY POINT #0 |
| #1 | SECTOR ADDRESS OF ENTRY POINT #1 |
| #2 | SECTOR ADDRESS OF ENTRY POINT #2 |
| #3 | SECTOR ADDRESS OF ENTRY POINT #3 |
| -------- | |
| | SECTOR ADDRESS OF ENTRY POINT #N-2 |
| #N-1 | SECTOR ADDRESS OF ENTRY POINT #N-1 |

FIG. 14

| PACKET START CODE PREFIX | ID | LENGTH | **** ID | **** PACKET TYPE | CURRENT # DATA STREAMS | CURRENT # VIDEO STREAMS | CURRENT # AUDIO STREAMS | −3 | −2 | −1 | +1 | +2 | +3 |
|---|---|---|---|---|---|---|---|---|---|---|---|---|---|

FIG. 20
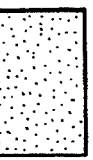 I-PICTURE (150 KBITS/FRAME)
 P-PICTURE (75 KBITS/FRAME)
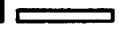 B-PICTURE (6 KBITS/FRAME)
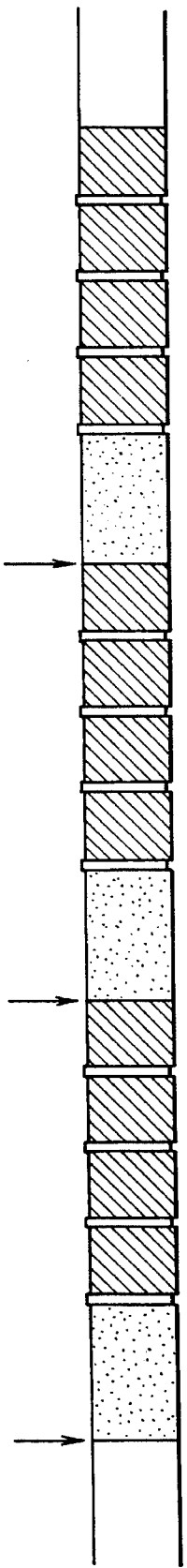

APPARATUS AND METHOD FOR PROVIDING PLURAL PICTURES WHILE SEARCHING A RECORDING MEDIUM WHEREON A COMPRESSED PICTURE SIGNAL IS RECORDED

FIELD OF THE INVENTION

This invention relates to an apparatus and method for providing multiple pictures during a high-speed search on a recording medium on which a compressed picture signal is recorded

BACKGROUND OF THE INVENTION

Examples of a conventional recording apparatus and a conventional reproducing apparatus are shown in FIGS. 1 and 2. Referring to FIG. 1, the digital video signal to be recorded is compressed and coded by the video encoder 1, and then fed into the video signal buffer 4 in the multiplexing circuit 3. The digital audio signal to be recorded is compressed and coded by the audio encoder 2, and then fed into to the audio signal buffer 5 in the multiplexing circuit 3.

The output terminals of the signal buffers 4 and 5 are connected to the input terminals E1 and E2 of the switching circuit 6, respectively. The output terminal F of the switching circuit 6 is connected to the input terminal of the header addition circuit 7. The output of the header addition circuit 7 is supplied to the digital storage medium (DSM) 10, which includes, for example, a magneto-optical disk or a magnetic disk, e.g., a hard disk. The control circuit 8 receives system clock signals from the multiplexing system clock generation circuit 9, and causes the switching circuit 6 to connect the output terminal F to the input terminals E1 and E2 successively at a predetermined time interval. This successively fetches video signal bytes from the video signal buffer 4 and audio signal bytes from the audio signal buffer 5, thereby time division multiplexing the audio and video signals.

The control circuit 8 causes the switching circuit 6 and the header addition circuit 7 to produce a multiplexed signal having the multiplexing system format defined in the ISO 11172 (MPEG) standard. The multiplexed signal includes one or more packs (PACK) and one ISO_1172_end_code, as shown in FIG. 3. The ISO_11172_end_code is a code of 32 bits and is, when represented in the hexadecimal notation, 0x000001B9. The prefix 0x indicates hexadecimal notation, where x is indeterminate.

Each pack includes a header, which includes a Pack_Start_Code, a System Clock Reference (SCR), a MUX_Rate, and one or more packets (Packet). The Pack_Start_Code of the header is a code of 32 bits and is 0x000001B4, the prefix 0x once again indicating hexadecimal notation. A pack has a variable length up to a maximum of 2,048 bytes.

Each packet includes a header, which includes a Packet_Start_Code_Prefix, a stream_ID, a Packet_length, a Presentation Time Stamp (PTS), and a Decoding Time Stamp (DTS), and a packet data portion. The Packet_Start_Code_Prefix is a code of 24 bits and is 0x000001. The Stream_ID is a code of 8 bits and indicates the type of the packet, as shown in FIG. 4. The Packet_length (16 bits) indicates the length of the packet following it.

The packet data portion of each packet consists of a portion of the digital audio signal (when the stream type indicates an audio stream) or a portion of the video signal (when the stream type indicates a video stream). Further, since each audio stream can have one of 32 different stream_IDs and the each video stream can have one of up to 16 different stream_IDs, up to 32 different audio signals and up to 16 different video signals can be multiplexed.

A reserved stream includes subtitle data, for example. Private_stream_1 and private_stream_2 do not have defined applications. A padding_stream is used to increase the amount of data.

The control circuit 8 (FIG. 1) controls adding headers and reading signal bytes using an algorithm such as that shown, for example, in FIG. 5 so that a total of 2,048 bytes are included in each pack in accordance with the format described above.

Referring to FIGS. 1 and 5, at step S1, the control circuit 8 instructs the header addition circuit 7 to generate a pack header. Then, at step S2, the control circuit 8 waits until the sum of M4 and M5 is equal to or greater than the number of signal bytes D included in one pack. In other words, the control circuit 8 waits until the total number of signal bytes accumulated in the signal buffers 4 and 5 is equal to the number of bytes that can be accommodated by one pack. M4 represents the number of bytes of video signal written in the video signal buffer 4, and M5 represents the number of bytes of audio signal written in the audio signal buffer 5. D represents a total number of signal bytes that can be accommodated in one pack. To simplify the description, it will be assumed that D is a constant obtained by subtracting the number of bytes in the pack headers, the number of bytes in the video packet headers, and the number of bytes in the audio packet headers, from the number of bytes (2,048) in a pack.

In step S3, the number of bytes P1 of video signal that will be accommodated in the pack and the number of bytes P2 of audio signal that will be accommodated in the pack are calculated using the following equations:

$P1 = D \times M4/(M4+M5)$ $P2 = D - P1$

Thus, P1 and P2 are calculated by distributing the total number of signal bytes D accommodated by the pack according to the ratio of numbers of bytes M4 and M5 accumulated in the signal buffers 4 and 5.

At step S4, after the numbers of signal bytes are determined, the control circuit 8 instructs the header addition circuit 7 to generate a video packet header, and to feed the video packet header to the DSM 10. Then, at step S5, the control circuit 8 transfers P1 bytes of video signal from the video signal buffer 4 to the DSM 10. At step S6, the control circuit 8 causes the header addition circuit to generate an audio packet header, and to feed it to the DSM 10. At step S7, the control circuit 8 transfers P2 bytes of audio signal from the signal buffer 5 to the DSM 10. The DSM 10 records the multiplexed signal received from the multiplexing circuit 3. At step S8, the control circuit tests whether all the video signal and all of the audio signal have been multiplexed. If the result is NO, execution returns to step S1. If the result is YES, execution proceeds to step S9, at which step the program ends.

The multiplexed signal recorded on the DSM 10 in this manner is reproduced and decoded by the reproducing apparatus shown in FIG. 2. In FIG. 2, the header separation circuit 22 in the separation circuit 21 separates pack headers and packet headers from the multiplexed signal read out from the DSM 10. The header separation circuit 22 supplies the headers to the control circuit 24, and supplies the multiplexed signal to the input terminal G of the switching circuit 23. The output terminals H1 and H2 of the switching circuit 23 are connected to the input terminals of the video decoder 25 and the audio decoder 26, respectively. The control circuit 24 in the separation circuit 21 successively connects the input terminal G of the switching circuit 23 to the output terminals H1 and H2 in accordance with the stream ID of the packet header received from the header separation circuit 22. In this way, the audio signal and the video signal are demultiplexed from the multiplexed signal, and are supplied to the corresponding decoder.

When the video encoder 1 codes the video signal to be recorded in accordance with the MPEG coding standard, this imposes limitations on performing random access or searching operations. A video signal that is compressed according to the MPEG standard includes intra-picture coded pictures, I (intra) pictures, and two types of inter-picture coded pictures: P (forward predictive) pictures and B (bidirectional predictive) pictures. Of the three types of pictures, only I-pictures are compressed independently of other pictures, and can therefore be said to be intrinsically expandable. To decode the video signal of an I-picture requires only the video signal of the I-picture itself, and does not require the video signals of other pictures. However, because of this, the coding efficiency of I-pictures is low. Since P-pictures and B-pictures are obtained by decoding difference signals from preceding and/or following reference pictures, the compression efficiency of such pictures is high. However, decoding a P-picture or a B-picture requires that the video signal of a reference picture preceding or following the picture be decoded in addition to the video signal of the picture. Consequently, during a search, only about two I-pictures are normally reproduced each second. This provides a random access facility while retaining an acceptable average compression efficiency.

FIG. 6 shows a diagram of a digital video signal including I-pictures, P-pictures, and B-pictures as it is recorded on the DSM 10. The digital video signal is divided into more than one Groups of Pictures (GOPs). Each GOP begins with an I-picture. When the video signal is compressed at a fixed rate, since an I-picture periodically appears at a predetermined location, the location can be determined by calculation and the I-picture accessed. However, when the video signal is compressed at a variable rate, the location of the I-pictures is indeterminate, and it is thus difficult to access the I-pictures.

When a search command is received by the reproducing apparatus shown in FIG. 2, a main control apparatus (not shown) delivers to the control circuit 24, the video decoder 25, and the audio decoder 26, an instruction to transition to search mode. In search mode, the video decoder 25 decodes only the I-pictures in the video signal received from the switching circuit 23. Alternatively, only video signals representing I-pictures are selected by the separation circuit 21 and fed into the video decoder 25. The video decoder 25 then decodes the video signals that it receives.

In search mode, the control circuit 24 commands the DSM 10 to move the read position on the disk forwards or backwards. The amount of movement of the read position depends upon the search rate, the compression ratio, etc.; generally, the amount of movement increases as the rate of the search increases and as the compression ratio increases. When the read position has moved to the selected location, the multiplexed signal is read from the DSM 10 and fed into the separation circuit 21. The header separation circuit 22 and the multiplexer 23 separate the video signal and supply it to the video decoder 25. The video decoder 65 decodes the I-picture that appears first, and feeds it to the video output. The audio decoder 66 is muted in search mode.

In the manner just described, a search operation that successively reproduces I-pictures is performed by carrying out repeated random accesses. Thus, when, for example, the user commands a high-speed forward search, the video decoder 25 searches for an I-picture by skipping a predetermined number of frames of the video signal it receives, and then decodes and feeds out each resulting I-picture. Alternatively, the DSM 10 can search for I-pictures, and only reproduce video signals of I-pictures for decoding by the video decoder 25. A search operation involving a successive reproduction of I-pictures is carried out by repeating such operations.

A different example of a conventional recording apparatus and a different example of a conventional reproducing apparatus are shown in FIGS. 7 and 8, respectively. Referring to FIG. 7, the digital video signal to be recorded is fed into the video encoder 1, and the digital audio signal to be recorded is fed into the audio encoder 2. The outputs of the video encoder 1 and the audio encoder 2 are fed into the multiplexing circuit 3. The output terminal of the multiplexing circuit 3 is connected to the DSM 10, where the resulting multiplexed signal is stored for a first time.

The multiplexed signal read out of the DSM 10 is fed to the Table of Contents (TOC) addition circuit 50, which adds a TOC to the beginning of the multiplexed signal. Generation of the TOC will be described in detail below. The output of the TOC addition circuit 50 is fed to the input terminal of the sector header addition circuit 51. The output of the sector header addition circuit 51 is fed to the Error Correction Coding (ECC) encoder 52. The output of the ECC encoder 52 is fed to the modulation circuit 53, which feeds the resulting recording signal to the cutting machine 54, which cuts the optical disk master 60. Plural optical disks for distribution to consumer or professional users, such as the optical disk 60A shown in FIG. 8, are manufactured using the optical disk master 60.

The input terminal of the entry point storage device 33A is connected to the output terminal of the video encoder 1, or to the video entry point detection circuit 31, so that it receives and stores entry point information from either one of them. The output of the entry point storage device 33A is fed to the TOC generation circuit 56, which arranges the format of the TOC. The TOC is fed to the TOC addition circuit 50, which adds the TOC to the beginning of the multiplexed signal, as described above.

The video signal to be recorded is compressed and coded by the video encoder 1, and then fed to the multiplexing circuit 3. The audio signal to be recorded is compressed and coded by the audio encoder 2, and then fed to the multiplexing circuit 3. The multiplexing circuit 3 multiplexes the coded video signal and the coded audio signal it receives using time-division multiplexing. The multiplexed signal is fed into the DSM 10, which stores it. This process is continued until all of the video signal and all of the audio signal have been recorded on the DSM 10.

An output of the video encoder 1 is connected to the entry point storage device 33A. When the video encoder 1 is capable of providing an entry point generation signal, it provides an entry point generation signal when it generates an I-picture. The entry point storage device 33A receives from the video decoder 1, and stores, the entry point generation signal generated each time the video encoder generates an I-picture.

An output of the video encoder 1 is also connected to the input terminal of the video entry point detection circuit 31.

When the video encoder 1 is incapable of providing an entry point generation signal, or when the digital video signal to be recorded is already encoded, the video entry point detection circuit 31 either generates an entry point generation signal each time an I-picture is generated, or detects the entry points in the video signal it receives from the video encoder 1, and provides an entry point generation signal in response. The entry point storage device 33A receives from the video entry point detection circuit 31, and stores, an entry point generation signal each time an entry point is detected.

After the video signal and the audio signal have been coded and multiplexed, the resulting multiplexed signal is written in the DSM 10. Simultaneously, the entry points required to construct a TOC are all stored in the entry point data storage device 33A. Then, processing for adding the TOC is started.

First, the required entry points are fed from the entry point storage device 33A to the TOC generation circuit 56. A selection is then made by the user or a controller (not shown). The entry points fed to the TOC generation circuit 56 are arranged in the format shown in FIG. 9. In this example, the TOC includes the positions of N entry points. Each entry point is indicated by a sector address of 4 bytes.

Returning to FIG. 7, the TOC generated by the TOC generation circuit 50 is delivered to the TOC addition circuit 50, whence it is fed to the sector header addition circuit 51 ahead of the multiplexed signal stored in the DSM 10. Then, following the TOC, the multiplexed signal is fed from the DSM 10, through the TOC addition circuit 50, to the sector header addition circuit 51.

As shown in FIG. 10, each sector has a sector header of 16 bytes, and accommodates 2,048 bytes. The sector header includes the sector number of the sector. The sector header addition circuit 51 divides multiplexed signal received from the TOC addition circuit 50 into blocks of 2,048 bytes, and adds a sector header of 16 bytes that includes the sector number. The output of the sector header addition circuit 51 is fed into the error correction coding (ECC) encoder 52.

The ECC encoder 52 adds a prescribed amount of parity data to the multiplexed signal received from the sector header addition circuit 51, and feeds the resulting signal to the modulation circuit 53. The recording signal from the modulation circuit 53 is fed to the cutting machine 54, which records the optical disk master 60 in response to the recording signal.

In the reproducing apparatus shown in FIG. 8, the signal recorded on the optical disk 60A is reproduced by the pickup 61. The output signal from the pickup 61 is fed into the demodulation circuit 62, which demodulates the signal from the pickup 61, and feeds the demodulated signal into the ECC circuit 63. The ECC circuit 63 detects and corrects errors in the demodulated signal, and feeds the resulting multiplexed signal into the demultiplexer circuit 64.

The video signal 66 demultiplexed by the demultiplexer circuit 64 is fed into the video decoder 65, while the audio signal is fed from the demultiplexer circuit to the audio decoder 66. The video decoder 65 and the audio decoder 66 individually reverse the compression of the compressed signals to provide uncompressed video and audio output signals, respectively.

In response to an instruction from the user (not shown) to reproduce the signal recorded on the disc, the controller 67 sends a command to the video decoder 65 and the audio decoder 66, and provides an access command to the drive control circuit 69. The drive control circuit 69 drives the pickup 61 using the tracking servo circuit 70 in accordance with the command from the controller 67 to begin reproducing from the disc.

The TOC at the beginning of the signal recorded on the disk is separated by the demultiplexer circuit 64, fed to the controller 67, and stored in the TOC storage device 68. The TOC is read out from the TOC storage device 68 when necessary, to be used by the controller 67.

Operation of the conventional disk reproducing apparatus shown in FIG. 8 will now be described. When the optical disk 60A is inserted, the controller 67 delivers a first sector reading command to the drive control circuit 69. The drive control circuit 69 drives the pickup 61 by way of the tracking servo circuit 70 to start reproducing from the first sector of the disk 60A.

The pickup 61 illuminates the optical disk 60A with a laser beam, and reproduces the signal recorded on the optical disk 60A using reflected light from the disk. The signal from the pickup 61 is fed to, and is demodulated by, the demodulation circuit 62. The demodulated signal is fed to the ECC circuit 63, where error detection and correction are performed. The resulting multiplexed signal from the ECC circuit is fed to the demultiplexer circuit 64.

The TOC is recorded in first sector of the disk. The TOC is demultiplexed by the demultiplexer circuit 64 and is fed to the controller 67. The controller 67 stores the TOC in the TOC storage device 68, and displays the TOC to the user (not shown) on a display (not shown).

In response to an instruction from the user (not shown) to reproduce an item selected from the TOC, the controller 67 delivers a command to the drive control circuit 69 to start operation. The drive control circuit 69 drives the pickup 61 by way of the tracking circuit 70 to start reproducing from the disk 60A at the read position indicated by the user's selection from the TOC. The drive control circuit 69 also simultaneously delivers a command to the video decoder 65 and to the audio decoder 66 to prepare to decode the signals reproduced from the disk.

Simultaneously with reading the TOC, the pickup 61 illuminates the optical disk 60A with a laser beam, and reproduces the signal recorded on the disk using reflected light from the disk. The signal from the pickup 61 is fed to, and is demodulated by, the demodulation circuit 62. The demodulated signal is fed to the ECC circuit 63, where error detection and correction are performed. The resulting multiplexed signal is fed into the demultiplexer circuit 64.

The video signal demultiplexed by the demultiplexer circuit 64 is fed to the video decoder 65, while the audio signal demultiplexed by the demultiplexer circuit is fed to the audio decoder 66. The video signal and the audio signal, which are compressed, are expanded by the video decoder 65 and the audio decoder 66, respectively, to provide an uncompressed digital video signal and an uncompressed digital audio signal.

When the video signal to be recorded is compressed in accordance with the MPEG coding standard, this imposes a limitation on performing random access or searching operations. In particular, as described above, a video signal compressed according to the MPEG standard includes intra-picture coded pictures, I (intra) pictures, and two types of inter-picture coded pictures: P (forward predictive) pictures and B (bidirectional predictive) pictures. Of the three types of I-pictures are coded independently of other pictures. To decode the video signal of an I-picture requires only the video signal of the I-picture itself, and does not require video signals relating to other pictures. Hence, an I-picture can be decoded by itself. However, because of this, the compression efficiency of I-pictures is low. Since P-pictures and B-pictures are obtained by decoding difference signals from preceding and/or following reference pictures, the compression efficiency of such pictures is high. To decode a P-picture or a B-picture requires that the video signal of a reference picture preceding or following the picture additionally be decoded in addition to the video signal of the picture. Consequently, during a search, only about two I-pictures are normally reproduced each second. This provides a random access facility while retaining an acceptable average compression efficiency.

The digital video signal including I-pictures, P-pictures and B-pictures recorded on the optical disk 60A is divided into more than one Groups of Pictures (GOPs) as described above with reference to FIG. 6. As described above, each GOP begins with an I-picture. When the video signal is compressed at a fixed rate, since an I-picture periodically appears at a predetermined location, the location can be determined by calculation and the I-picture accessed. However, when the video signal is compressed at a variable rate, the location of the I-pictures is indeterminate, and it is thus difficult to access the I-pictures.

In particular, when a search command is received by the disk reproducing apparatus shown in FIG. 8, the controller 67 delivers to the drive control circuit 69, the video decoder 65, and the audio decoder 66, an instruction to transition to search mode. In search mode, the video decoder 66 decodes only the I-pictures in the video signal it receives. Alternatively, only video signals representing I-pictures are selected and fed by the demultiplexer circuit 64 to the video decoder 65. The video decoder 65 then decodes the video signals that it receives.

In search mode, the drive control circuit 69 commands the tracking servo circuit 70 to move the read position on the disk forwards or backwards. The amount of movement of the read position depends upon the search rate, the compression ratio, etc.; generally, the amount of movement increases as the rate of the search increases, and as the compression ratio increases. When the read position has moved to the selected location, the signal from the pickup 21 is fed to the demultiplexer circuit 64 via the demodulation circuit 62, and the ECC circuit 63. The demultiplexer circuit 64 demultiplexes the video signal and supplies it to the video decoder 65. The video decoder 65 decodes the I-picture that appears first, and feeds it to the video output. The audio decoder 66 is muted in search mode.

In the manner just described, a search operation that successively reproduces I-pictures is performed by carrying out repeated random accesses. Thus, when, for example, the user commands a high-speed forward search, the video decoder 25 searches for an I-picture by skipping a predetermined number of frames of the video signal it receives, and then decodes and feeds to the output each resulting I-picture. Alternatively, in response to an instruction from the controller 67, the drive control circuit 69 can drive the tracking servo circuit 70 to search for only I-pictures, and the video signals of only I-pictures are supplied to, and decoded by, the video decoder 65. A search operation involving a successive reproduction of I-pictures is carried out by repeating such operations.

The time required for provide one I-picture during a search will now be estimated on the assumption that the optical disk 60A is a CD-ROM. The time to provide one I-picture is the sum of the following times:

Head seek time: α(depends upon the mechanical structure)

Servo settling time: β(depends upon the servo circuit parameters)

Maximum latency: about 300 milliseconds at the outer circumference of the CD-ROM Read time: about 150 milliseconds for one I-picture The maximum latency is the time required at the outermost circumference (diameter=116 mm) of the CD-ROM for the CD-ROM to make 1 revolution at a linear velocity of 1.2 m/s.

The read time is calculated as follows:

The MPEG standard allocates different numbers of bits to an I-picture, a P-picture, and a B-picture to achieve efficient compression. For example, the standard allocates 150 kbits to an I-picture, since compression is applied within the picture only; 75 kbits to a P-picture, since also this type of picture is also comparatively important; and 5 kbits to a B-picture, since this type of picture is interpolated bidirectionally. Thus, for example, about 500 kbits are required to code a COP of 15 pictures consisting of one I-picture, four P-pictures and ten B-pictures. The data rate of a CD-ROM is about 1 Mbits per second. Hence, in this example, the time to read one I-picture of 150 kbits is 150/1,000=150 milliseconds.

The head seek time α and the servo settling time β are very short compared with the latency and the read time, and can therefore be ignored. Consequently, the maximum time between consecutive displayed I-pictures is the sum of the maximum latency and the read time, i.e., about 450 milliseconds.

From the foregoing calculations, it can be seen that in the conventional method in which only one I-picture is reproduced at each entry point, the picture changes once in a maximum of 450 milliseconds. Consequently, as few as two new pictures can be displayed each second.

OBJECTS AND SUMMARY OF THE INVENTION

As described above, in the conventional apparatus, since the position of an I-picture, i.e., an access point, cannot be known because of the variable compression ratio, the access point must be awaited after the read point on the disk has been moved by some amount. Consequently, the cycle time of the search process is long, which makes rapid searching difficult.

Further, in the conventional apparatus, since the latency and the read time for an I-picture are very long, as described above, the period between consecutive pictures during a search is very long. A search operation that changes the picture only once or twice a second is not acceptable.

It is an object of the present invention to make it possible to find out an access point in the recorded video signal rapidly to achieve rapid searching.

It is a further object of the present invention to provide a more rapidly changing picture during a search without modifying the conventional hardware construction and format, and without noticeably slowing down the search.

Accordingly the invention provides a method of reproducing pictures from a recording medium in a search mode. Each picture is recorded in the recording medium in the form of a coded signal. The coded signal is coded in either an intra-picture coding mode or an inter-picture coding mode. The coded signal of a picture coded in the intra-picture coding mode is an I-picture; the coded signal of a picture coded in the inter-picture coding mode with only forward prediction is a P-picture; and the coded signal of a picture coded in the inter-picture coding mode with bidirectional prediction is a B-picture. The pictures are reproduced from a read position on the recording medium. In the method, the read position is changed to a first read position, and an I-picture is immediately reproduced from the recording medium at the first read position. Then, at least one B-picture or one P-picture is immediately reproduced from the recording medium following the I-picture. Finally, the I-picture and the at least one B-picture or P-picture is decoded to provide an output signal.

The invention also provides an apparatus for reproducing pictures from a recording medium in search mode. Each picture is recorded in the recording medium in the form of a coded signal. The coded signal is coded in either an intra-picture coding mode or an inter-picture coding mode. The coded signal of a picture coded in the intra-picture coding mode is an I-picture; the coded signal of a picture coded in the inter-picture coding mode with only forward prediction is a P-picture; and the coded signal of a picture coded in the inter-picture coding mode with bidirectional prediction is a B-picture. The apparatus includes a reproducing system reproduces pictures from a read position on the recording medium to provide a playback signal for each picture. A positioner for setting the read position from which the reproducing system reproduces from the recording medium. A control circuit controls the reproducing system and the positioner to reproduce pictures. The controller causes the positioner to change the read position to a first read position. The controller also causes the reproducing system to immediately reproduce an I-picture from the recording medium at the first read position, and additionally to reproduce from the recording medium at least one B-picture or one P-picture immediately after the I-picture. Finally, the apparatus includes a decoding circuit for decoding the playback signal of the I-picture and at the least one B-picture or P-picture to provide a decoded output signal.

BRIEF DESCRIPTION OF THE DRAWINGS

FIG. 4 shows the stream_ID portion of the packet shown in FIG. 3.

FIG. 9 shows the structure of the Table of Contents (TOC) in the examples shown in FIGS. 7 and 8.

FIG. 14 shows the format of the entry packet shown in FIG. 13.

FIG. 20 shows the structure of plural Groups of Pictures and the relative space occupied by I-pictures, P-pictures and B-pictures.

DETAILED DESCRIPTION OF THE INVENTION

Figure 1:
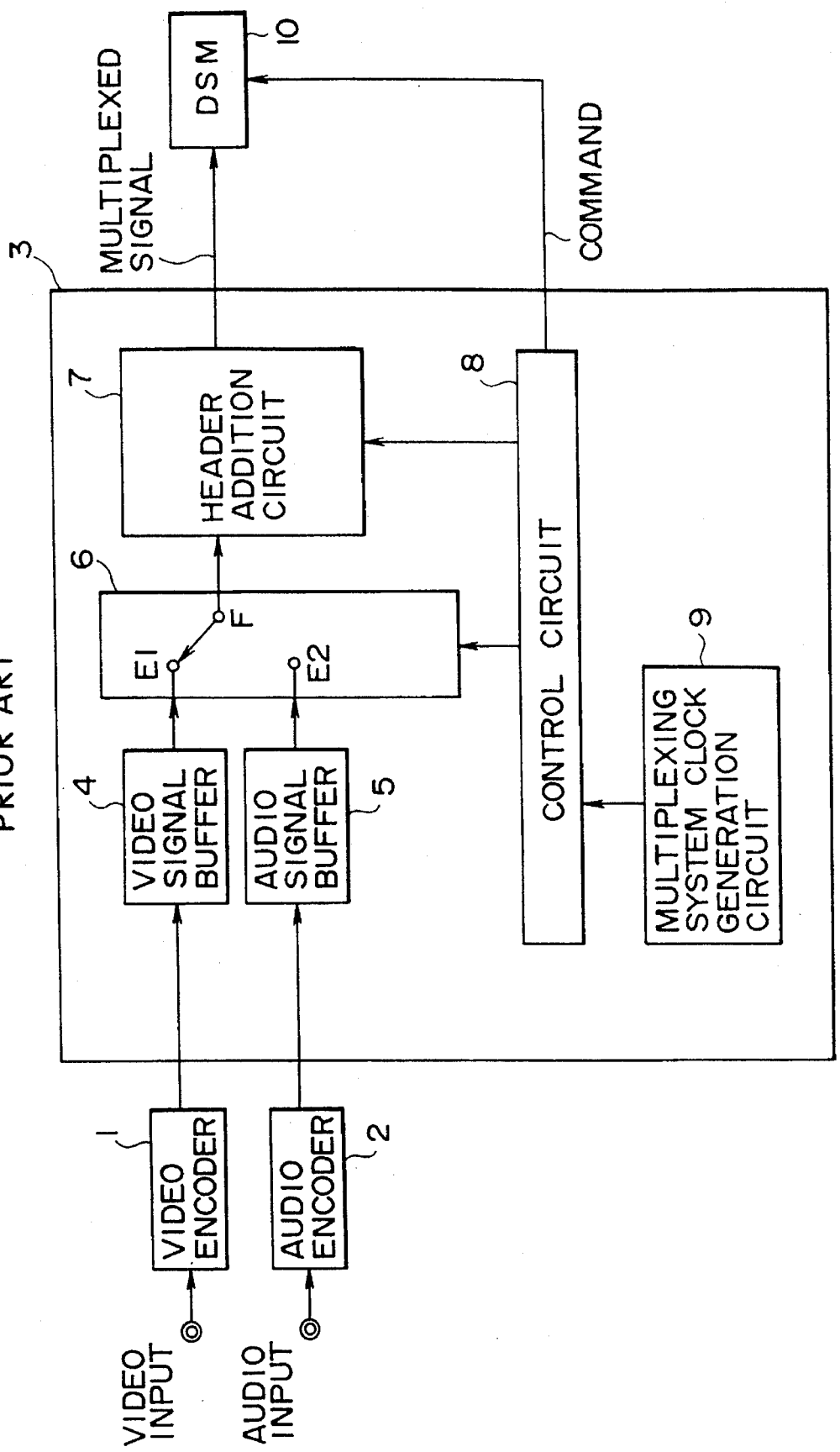
FIG. 1 is a block diagram showing the construction of an example of a conventional apparatus for recording multiplexed compressed audio and compressed video signals.
Figure 2:
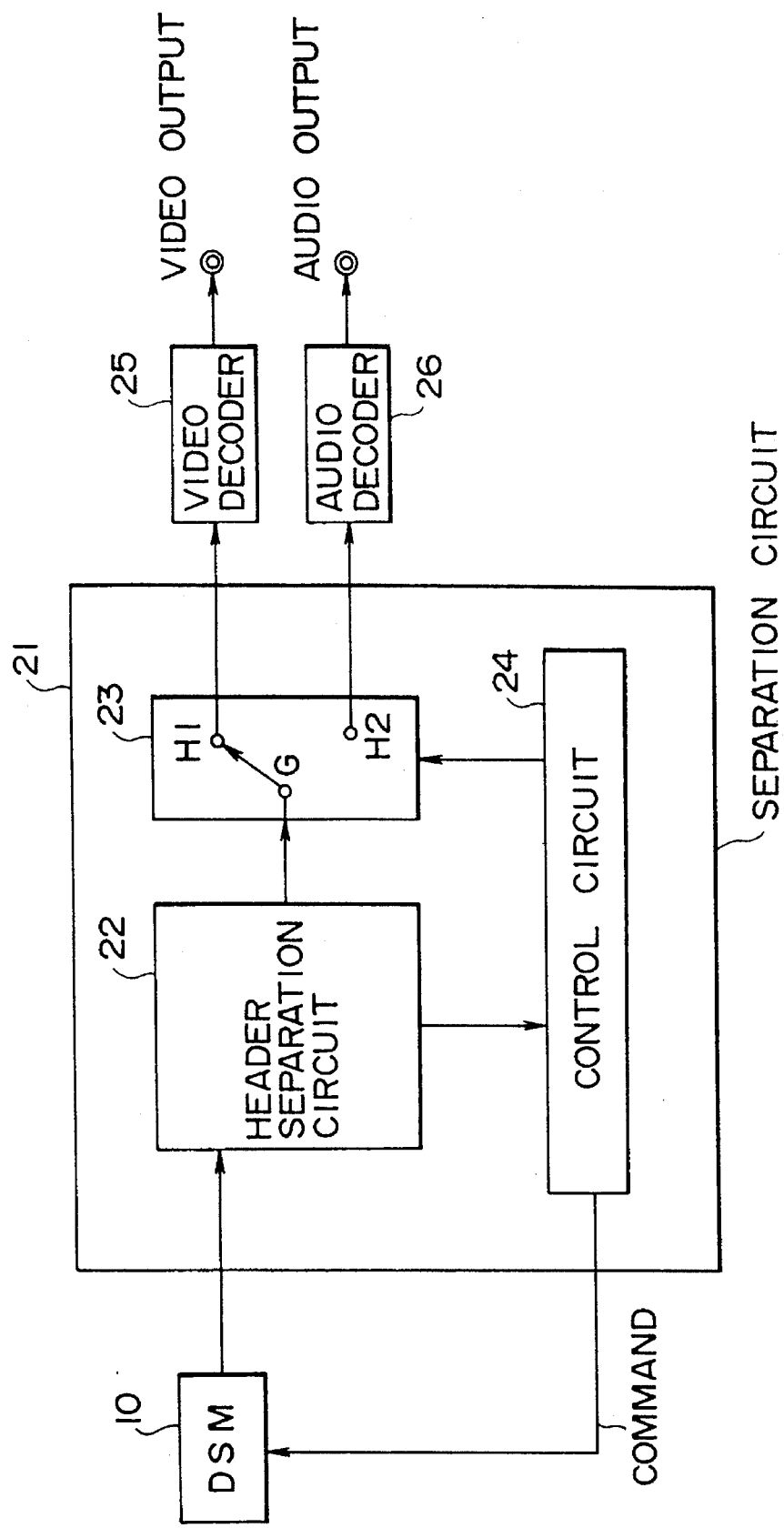
FIG. 2 is a block diagram showing the construction of an example of a conventional apparatus for reproducing multiplexed compressed audio and compressed video signals.
Figure 11:
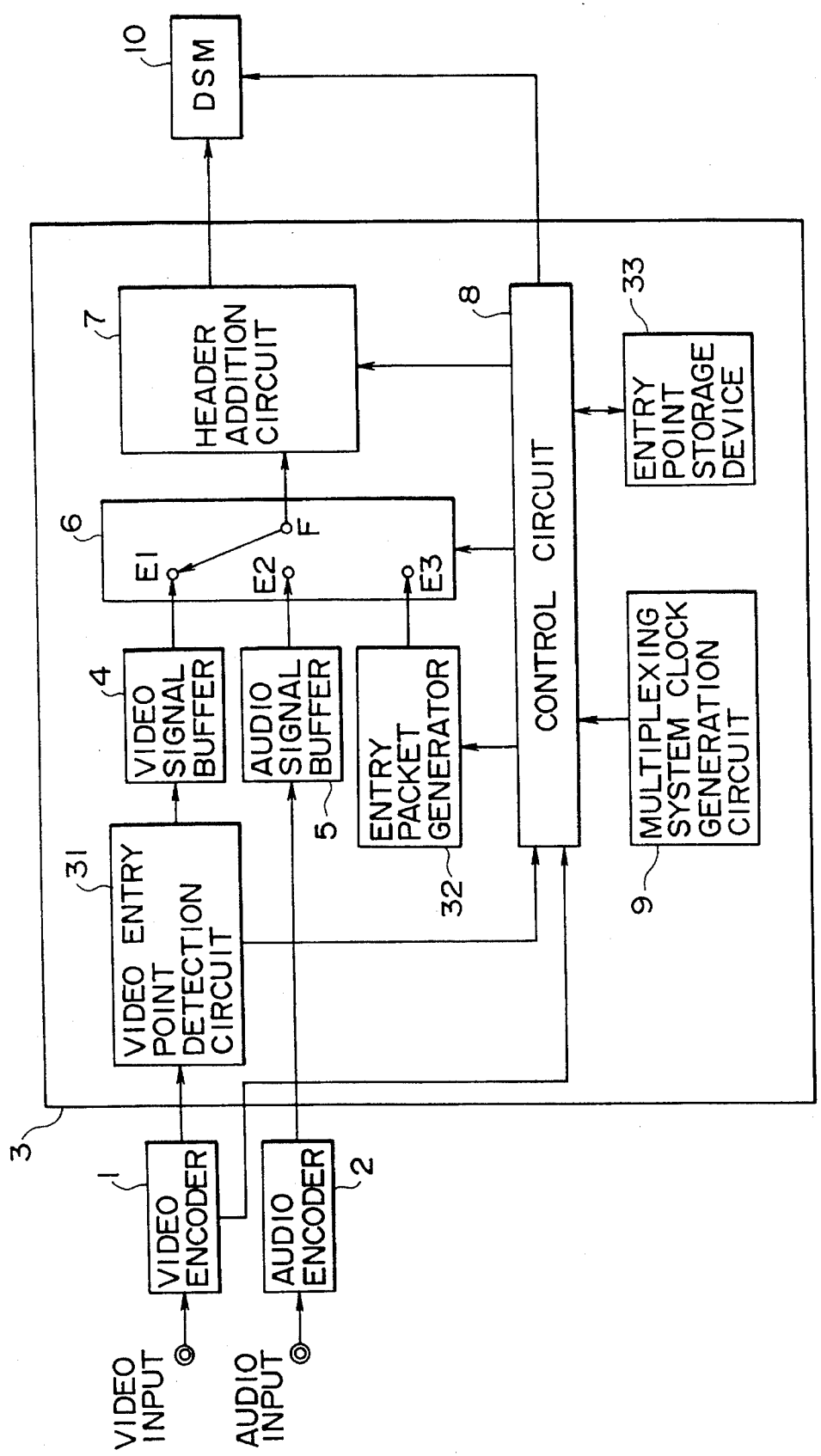
FIG. 11 is a block diagram showing the construction of an embodiment of a recording apparatus providing a recording that can be searched more rapidly than in the conventional example shown in FIG. 1.
Figure 12:
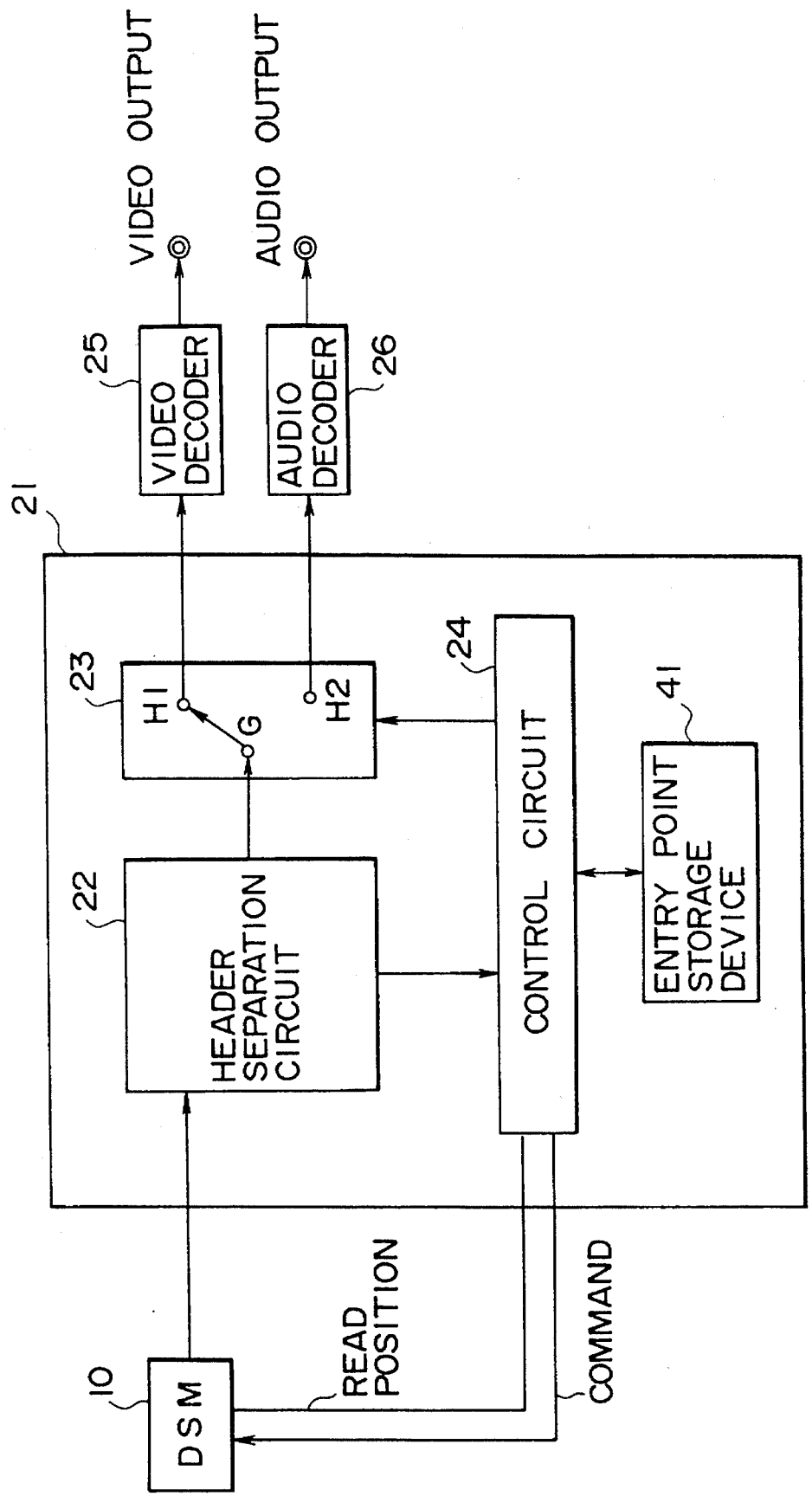
FIG. 12 is a block diagram showing the construction of an embodiment of reproducing apparatus capable of rapidly searching a recording made by the apparatus shown in FIG. 11.

FIG. 11 is a block diagram showing the construction of a recording apparatus for recording a multiplexed signal that enables the recording to be searched more rapidly than a recording made by the conventional apparatus shown in FIG. 1. FIG. 12 is a block diagram showing the construction of a reproducing apparatus capable of searching a recording made by the apparatus shown in FIG. 11 more rapidly than the conventional reproducing apparatus shown in FIG. 2. In FIGS. 11 and 12, components corresponding to those in the conventional apparatus shown in FIGS. 1 and 2 are indicated by the same reference characters.

In the recording apparatus shown in FIG. 11, the output terminal of the video encoder 1 is connected to the input terminal of the video entry point detection circuit 31, an output terminal of which is connected to the input terminal of the video signal buffer 4. The entry packet generation circuit 32 receives a control input from the control circuit 8, and supplies entry packets to the input terminal E3 in the switching circuit 6. The control circuit 8 also receives system clock signals from the multiplexing system clock generation circuit 9, and causes the switching circuit 6 to connect the output terminal F to the input terminals E1, E2, and E3 successively at a predetermined time interval. This successively fetches, and multiplexes by time-division multiplexing, the video signal from the video signal buffer 4, the audio signal from the audio signal buffer 5, and entry packets from the entry packet generation circuit 32. The resulting time-division multiplexed signal is fed to the header addition circuit 7.

The control circuit 8 also causes the header addition circuit 7 to add a video packet header to the video signal read out from the video signal buffer 4, and to add an audio packet header to the audio signal read out from the audio signal buffer 5.

The control circuit 8 also receives as an input the entry point generation signal generated in response to an I-picture supplied by the video encoder 1 or the video entry point detection circuit 31, and causes the entry packet generation circuit 32 to insert an entry packet at a predetermined position in the video signal. When the video encoder 1 is capable of providing an entry point generation signal, it provides an entry point generation signal each time it generates an entry point. On the other hand, when the video encoder 1 is incapable of providing an entry point generation signal, or when the video signal to be recorded is already coded, the video entry point detection circuit 31 generates the entry point generation signal. The video entry point detection circuit generates an entry point generation signal when an I-picture is generated, or when it detects an entry point in the video signal it receives from the video encoder 1. The entry point storage device 33 is a memory that can be read and written by the control circuit 8, and which stores the position of each detected entry point. The construction of the rest of the apparatus is similar to that shown in FIG. 1.

Figure 3:
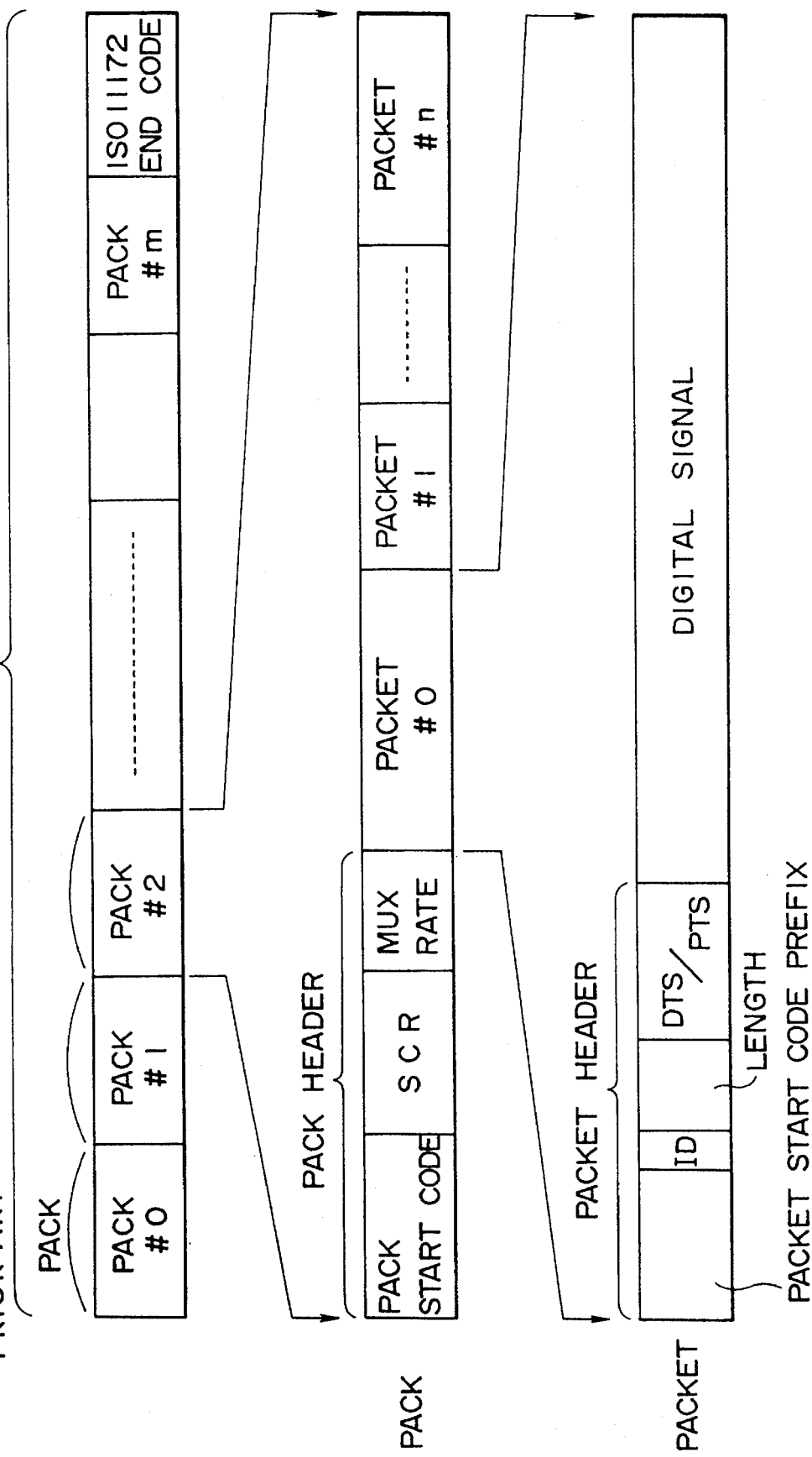
FIG. 3 shows the format of the multiplexed signal in the examples shown in FIGS. 1 and 2.

In the embodiment shown in FIG. 11, the multiplexed signal includes at least one pack, and an ISO__11172__end__ code. Each pack has the pack format shown in FIG. 3. The pack begins with a Pack__Header consisting of a Pack__Start__Code, an SCR, and a MUX__Rate. Following the Pack__Header is a video packet consisting of a Video__Packet__Header followed by a portion of the video signal that includes no I-picture. Following the video packet is an entry packet, followed by another video packet consisting of a Video__Packet__Header and a portion of the video signal that includes an I-picture. Thus, an entry packet is located immediately prior to the Video__Packet__Header of a video packet that includes an I-picture, i.e., an entry point. Also, an audio packet, consisting of an Audio__Packet__Header followed by a portion of the audio signal follows the video packet.

The entry packet has the format illustrated in FIG. 14. The format corresponds to the packet format of the private__stream__2 packet defined by the MPEG standard. The entry packet begins with a Packet__Start__Code__Prefix, followed by a stream__ID of 0xBF in hexadecimal notation, and the length of the packet. This arrangement is similar to that of the packet header shown in FIG. 3.

In the entry packet, a **__id follows the packet length. The __id indicates that the private__stream__2 packet has a format peculiar to the party identified by . Following the __id, the **__packet__type is disposed, which identifies the packet type from among the private packet types belonging to the identified party, and is set to 0xFF for an entry packet. There then follows current__#__data__streams, current__#__video__streams, and current__#__audio__streams indicating the number of data streams, the number of video streams, and the number of audio streams multiplexed immediately prior to the current entry point.

Following current__#__audio__streams are entry__packet__−3, entry__packet__−2, entry__packet__−1, entry__packet__+1, entry__packet__+2, and entry__packet__+3. These indicate the relative distances between the position of the current entry point and the positions of the three previous entry points and the three following entry points in terms of the number of sectors of the disk in the DSM 10. Alternatively, the positions of the preceding and following entry points can be indicated in terms of absolute locations on the DSM 10.

Figure 13:
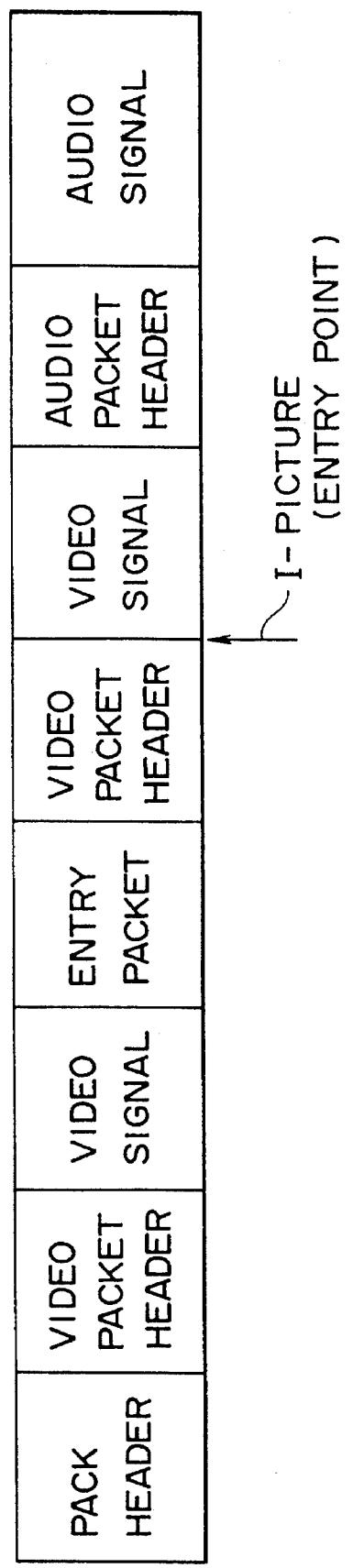
FIG. 13 shows the pack format on the disk of the DSM 10 of the embodiment shown in FIGS. 11 and 12.

Operation of the embodiment shown in FIG. 11 will now be described. The control circuit 8 receives an entry point generation signal from the video encoder 1 or from the entry point detection circuit 31, and inserts an entry packet immediately prior to the entry point (FIG. 13). In particular, when the control circuit 8 receives an entry point generation signal, the control circuit 8 causes the entry packet generation circuit 32 to generate an entry packet. The control circuit also causes the switching circuit 6 to switch to the input terminal E3 so that the entry packet can be multiplexed with the video signal and the audio signal from the signal buffers 4 and 5, respectively, and supplied to the header addition circuit 7.

As shown in FIG. 14, in each entry packet, the distances between the current entry point and the positions of the three previous entry points and the three following entry points are recorded in entry__packet__−3, entry__packet__−2, entry__packet__−1, entry__packet__+1, entry__packet__+2, and entry__packet__+3, respectively. When storing the positions of the three prior entry points in the entry packet storage device 33, this information is known and could be recorded on the DSM 10 when the current entry packet is recorded. However, the positions of the following entry points are not known when the current entry packet is recorded on the DSM 10. Therefore, the control circuit 8 stores the positions of all the entry points in the entry point storage device 33. Then, after all of the signals to be recorded have been recorded on the DSM 10, the control circuit 8 reads out from the entry point storage device 33 the positions of the three previous entry points and the three following entry points for each entry point. The control circuit 8 calculates from the read out positions the relative positions of the previous and following entry points from the current entry point, and supplies the relative positions to the DSM 10, which inserts them into each entry packet recorded on the DSM 10. Alternatively, the addresses of the three previous and three following entry points can be inserted into each entry packet.

Since the video encoder 1 and the audio encoder 2 encode the video signal and the audio signal, respectively, at a variable rate, the control circuit 8 causes the multiplexer 6 to include a total of 2,048 bytes in each pack. To achieve this, the control circuit 8 controls header addition, signal reading from the signal buffers 4 and 5, and entry packet insertion using an algorithm such as that shown, for example, in FIG. 15.

Figure 5:
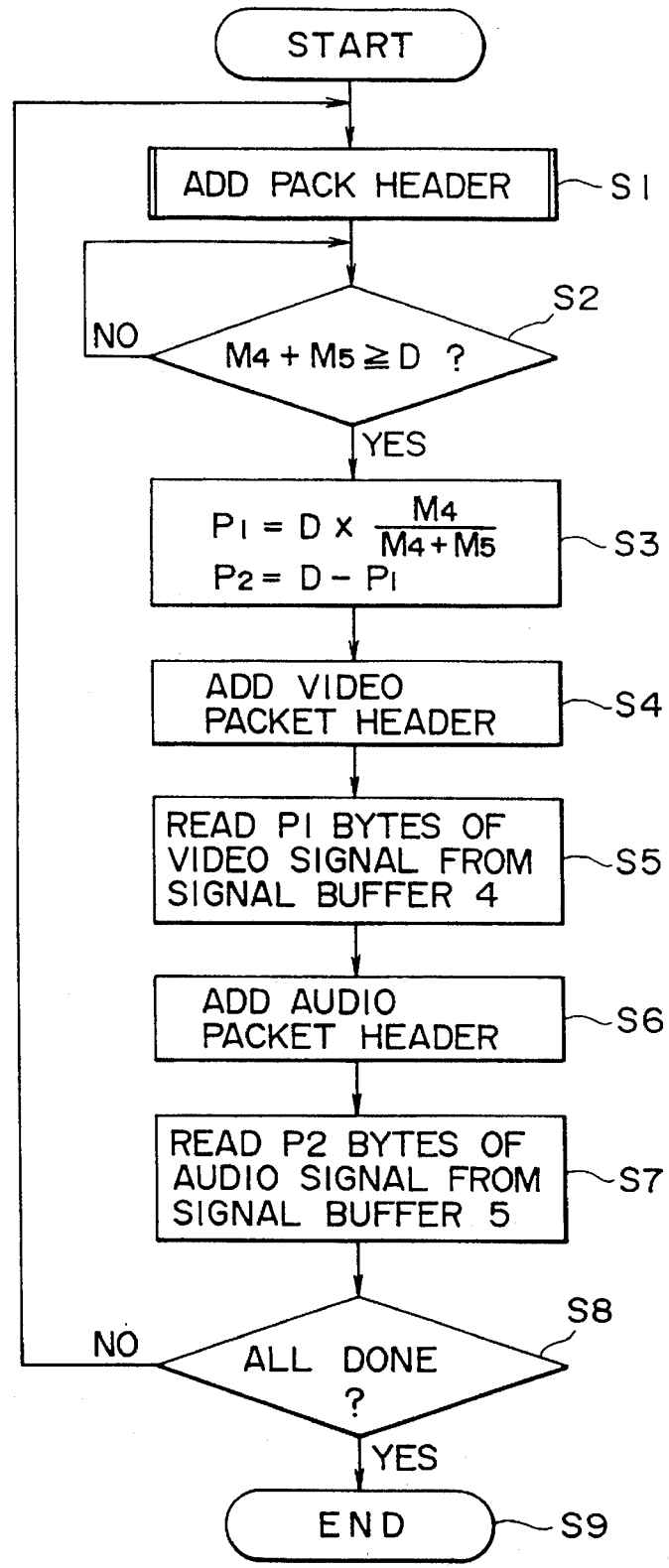
FIG. 5 is a flow chart illustrating part of the operation of the example shown in FIG. 1.
Figure 6:
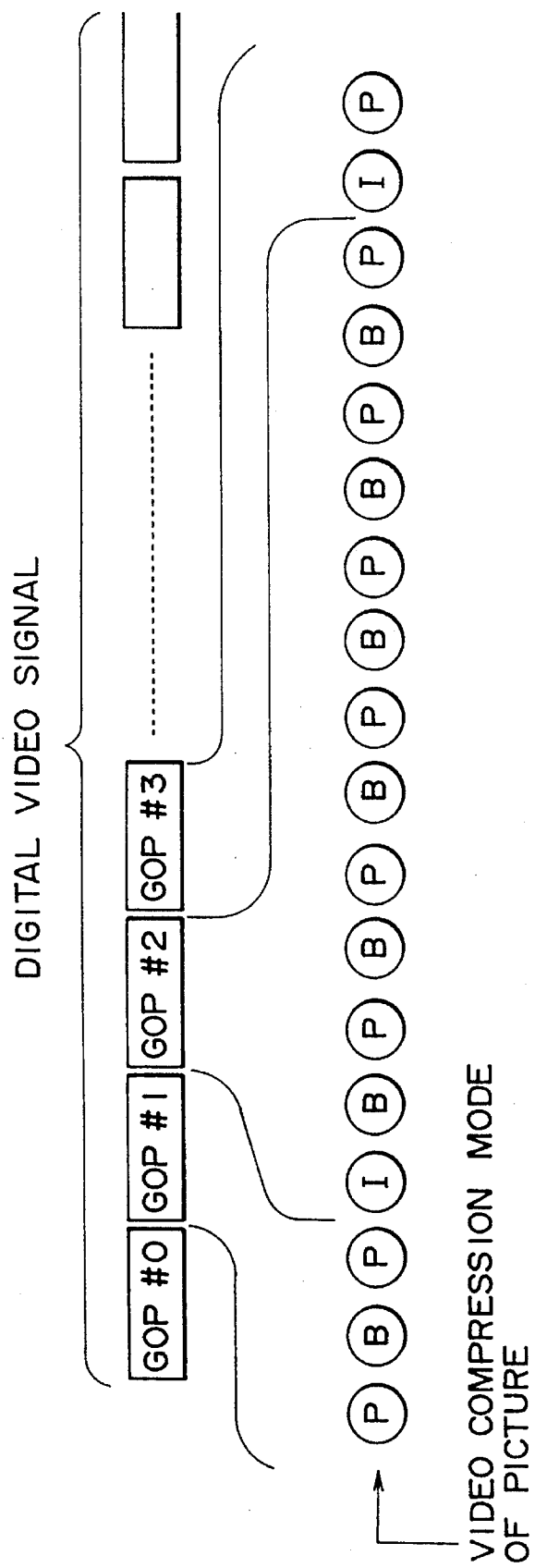
FIG. 6 shows part of the compressed video signal recorded on the disk of the DSM shown in FIGS. 1 and 2.

Similar to the processing shown in FIG. 5, M4 represents the number of bytes of video signal accumulated in the video signal buffer 4, and M5 represents the number of bytes of audio signal accumulated in the audio signal buffer 5. Further, D represents the total number of signal bytes in one pack. For simplicity, it will be assumed that D is a constant obtained by subtracting the number of bytes in the pack header, the number of bytes in the video packet header, and the number of bytes in the audio packet header from the number of bytes (2,048) in the pack. D2 represents the total number of signal bytes in a pack that includes an entry packet. D2 is obtained by subtracting the number of bytes in the entry packet and the number of bytes in the second video packet header from D.

Figure 15:
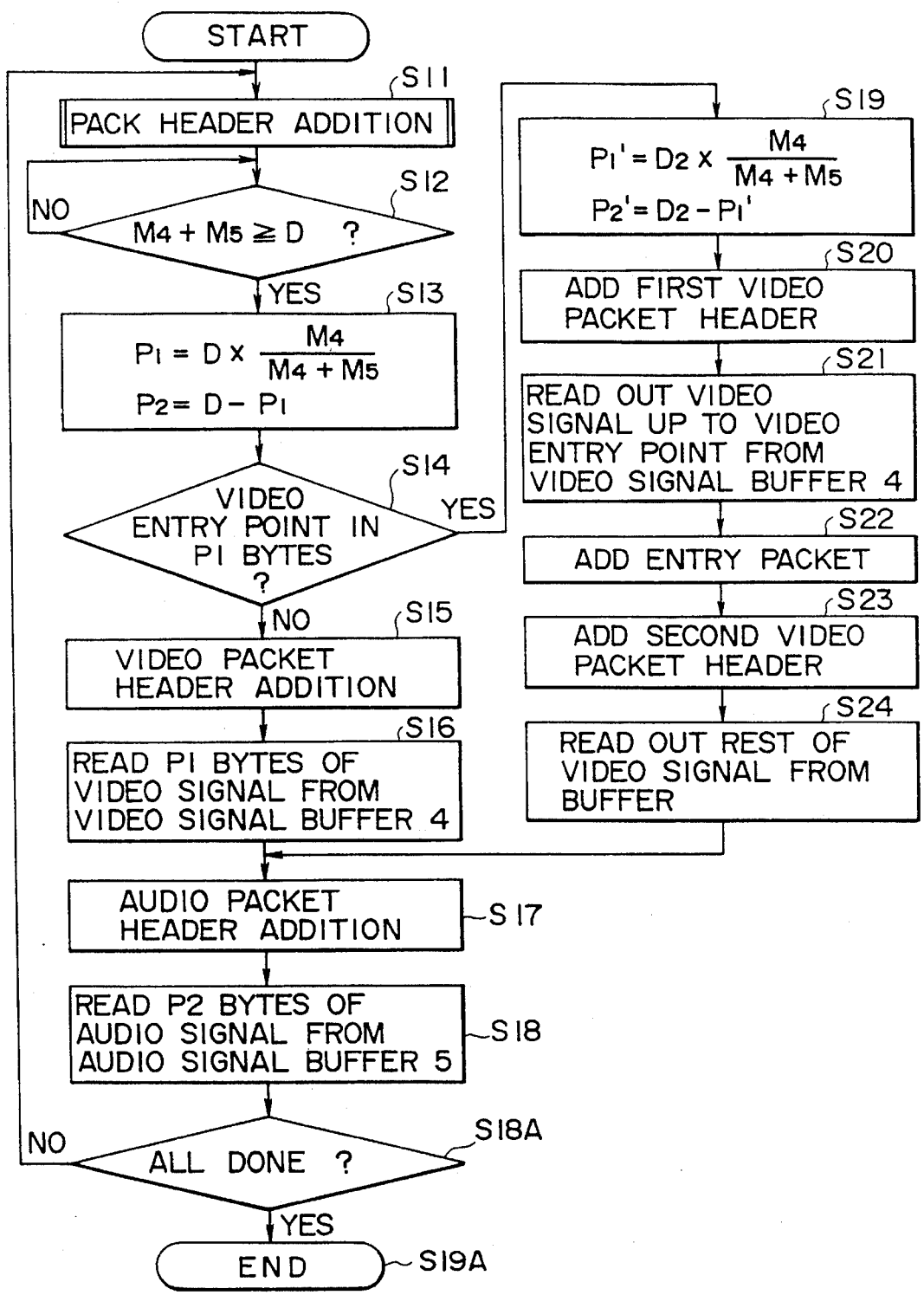
FIG. 15 is a flow chart illustrating part of the operation of the embodiment shown in FIG. 11.

In the algorithm shown in FIG. 15, in step S11, the control circuit 8 first instructs the header addition circuit 7 to generate a pack header. Then, at step S12, the control circuit 8 waits until the sum of M4 and M5 is equal to or greater than the number of signal bytes D accommodated in one pack. In other words, the control circuit 8 waits until after the total number of signal bytes accumulated in the signal buffers 4 and 5 is equal to the number of signal bytes accommodated by one pack.

At step S13, the number of bytes P1 of video signal that will be accommodated in the pack and the number of bytes P2 of audio signal that will be accommodated in the pack are calculated in accordance with the equations set forth below. P1 and P2 are calculated by distributing the total number of signal bytes D accommodated in the pack according to the ratio of numbers of signal bytes M4 and M5 accumulated in the respective signal buffers 4 and 5.

$P1=D \times M4/(M4+M5)$ $P2=D-P1$

At step S14, the control circuit 8 determines whether or not a video entry point is included in the first P1 bytes of the M4 bytes of video signal. If there is no video entry point in the video signal to be accommodated in the pack, at step S15, the control circuit 8 instructs the header addition circuit 7 to provide a video packet header. Then, at step S16, P1 bytes of video signal are transferred from the video signal buffer 4 to the DSM 10. Similarly, at step S17, the control circuit 8 instructs the header addition circuit 7 to provide an audio header, and, at step S18, P2 bytes of audio signal are transferred from the audio signal buffer 5 to the DSM 10.

At the next step, step S18A, the control circuit 8 tests whether all the video signal and all of the audio signal have been multiplexed. If the result is NO, execution returns to step S11. If the result is YES, execution proceeds to step S19A, at which step the program ends. This processing is similar to the processing described above with reference to FIG. 5.

If it is determined at step S14 that there is a video entry point in the video signal to be accommodated in the pack, the control circuit 8 first stores the position of the current pack in the entry point storage device 33, and execution branches to step S19. There, the number of bytes P1 of video signal and the number of bytes P2 of audio signal to be accommodated in the pack are recalculated in accordance with the equations:

$P1=D2 \times M4/(M4+M5)$ $P2=D2-P1$

The parameters calculated at step S13 are recalculated at step S19 because the number of signal bytes that can be accommodated in the pack is reduced when the pack includes the entry packet. P1 and P2 are recalculated by distributing the total number of signal bytes D2 accommodated by the pack according to the ratio of numbers of signal bytes M4 and M5 accumulated in the signal buffers 4 and 5.

At step S20, the header addition circuit 7 generates a video packet header and feeds it to the DSM 10. Then, at step S21, the control circuit 8 transfers the video signal up to immediately before the video entry point from the video signal buffer 4 to the DSM 10. At step S22, the entry packet generation circuit 32 generates the entry packet and feeds it to the DSM 10. However, the relative position information is not written in the entry packets written on the DSM 10 at this step.

At step S23, the header addition circuit 7 generates a second video packet header and feeds it to the DSM 10. At step S24, the remaining video signal bytes are transferred to the DSM 10. Then, execution returns to steps S17 and S18, where the audio packet header and P2 bytes of audio signal are transferred from the audio signal buffer 5 to the DSM 10. The DSM 10 records the resulting multiplexed signal.

At the next step, step S18A, the control circuit tests whether all the video signal and all of the audio signal have been multiplexed. If the result is NO, execution returns to step S11. If the result is YES, execution proceeds to step S19A, at which step the program ends. Then, when all of the signals to be recorded have been recorded, the relative position information is written into the entry packets already recorded on the DSM 10. The control circuit 8 reads out the position of each entry packet from the entry point storage device 33, calculates relative positions, and causes the relative positions of the three preceding entry packets and the three following entry packets to be written into each entry packet recorded on the DSM 10.

The apparatus for reproducing signals recorded by the embodiment of FIG. 11 will now be described with reference to FIG. 12. The header separation circuit 22 in the separation circuit 21 separates pack headers, packet headers and entry packets from the signal read out from the DSM 10 and supplies them to the control circuit 24. The remaining time-division multiplexed signal is supplied to the input terminal G of the switching circuit 23. The output terminals H1 and H2 of the switching circuit 23 are connected to the input terminals of the video decoder 25 and the audio decoder 26, respectively.

The control circuit 24 supplies each entry point it receives from the header separation circuit 22 to the entry point storage device 41, where it is stored. Since the current read position is supplied from the drive apparatus 10 to the control circuit 24, the control circuit 24 can store the contents of each entry point and the position of each entry point in a corresponding relationship to each other.

The control circuit 24 of the separation circuit 21 causes the switching circuit 23 to connect the input terminal G successively to the output terminals H1 and H2 in accordance with the stream_ID of the packet header received from the header separation circuit 22. This demultiplexes the time-division multiplexed signal received from the header separation circuit 22 and supplies the video signal to the video decoder 25 and the audio signal to the audio decoder 26.

Operation of the multiplexed signal reproducing apparatus shown in FIG. 12 during a search will now be described. In response to a search command, the main control apparatus (not shown) instructs the control circuit 24, the video decoder 25, and the audio decoder 26 to transition into search mode. The control circuit 24 reads the current read position from the DSM 10, and extracts information indicating the positions of entry points around the current read position from the entry point storage device 41. The entry point storage device 41 stores the entry point information from the entry packets reproduced in the course of reproducing the disk. Additionally or alternatively, the entry point information in all entry packets recorded on the DSM 10, or the entry point information in a predetermined range of entry packets may be read out and stored in the entry point storage device 41 at predetermined times, such as when the apparatus is first switched on, when a disk is mounted in the DSM 10, or in response to a reproduce instruction.

When the control circuit 24 determines an entry point location, it sends a search instruction to the DSM 10 to move the read position at high speed to the position of the entry point. When the movement is completed, the DSM 10 begins reproducing at the entry point, and supplies the reproduced signal to the separation circuit 21. As described above with reference to FIG. 13, an entry packet is disposed immediately before the video signal of an I-picture. Accordingly, if the video signal following the entry packet is separated by the header separation circuit 22 and supplied to the video decoder 25, then the first picture of the video signal is an I-picture. The video decoder 25 immediately decodes the I-picture and feeds it to the video output outputs. The audio decoder 26 is muted in search mode.

Since the relative positions of the three preceding entry points and three following entry points are recorded in each entry packet, the control circuit 24 uses the position information of the next entry packet written in the present entry packet to move the read position to the next entry packet, which it then reproduces. By repeating this process, a more rapid succession of I-pictures is reproduced.

The control circuit 24 causes the read position to jump to a more distant entry point when the rate of search is high, but causes the read position to jump to a closer entry point when the rate of search is low. Since the relative positions of three entry points in each of the forward and reverse directions are recorded, three or more variations in the search rate are available depending upon combinations of entry point positions selected.

Figure 7:
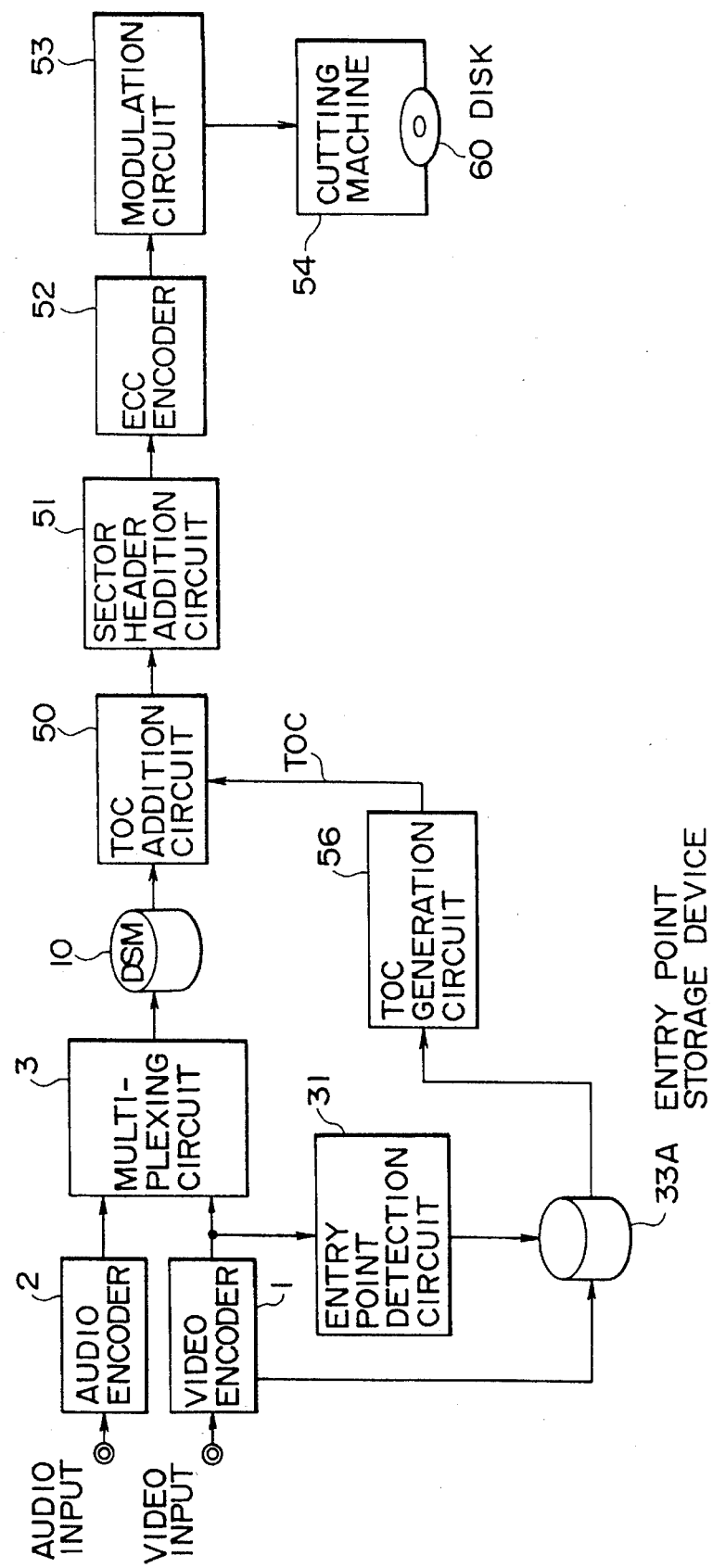
FIG. 7 is a block diagram showing the construction of another example of a conventional apparatus which records the multiplexed signal on an optical disk.
Figure 8:
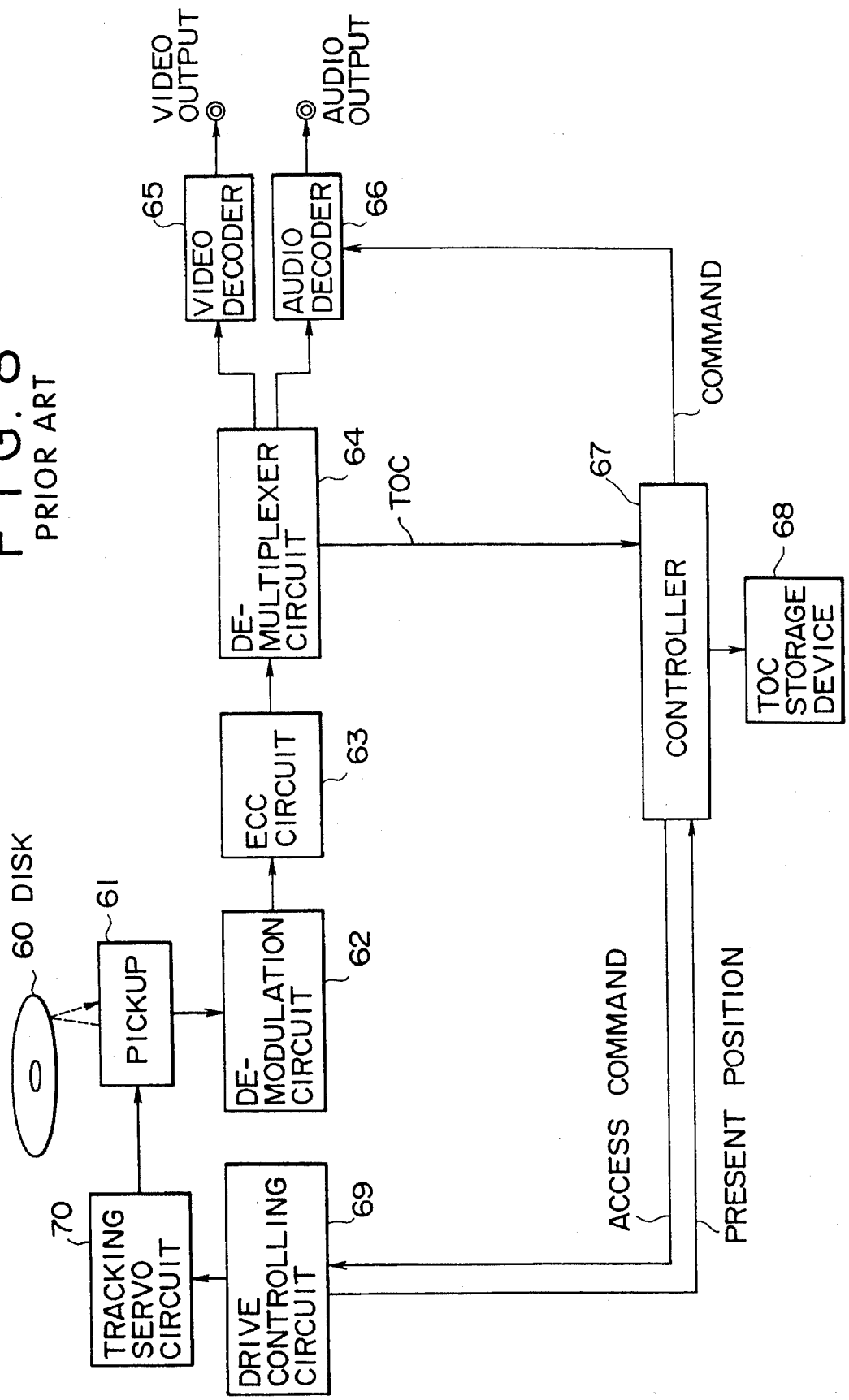
FIG. 8 is a block diagram showing a construction of another example of a conventional apparatus which reproduces the multiplexed signal from an optical disk.
Figure 10:
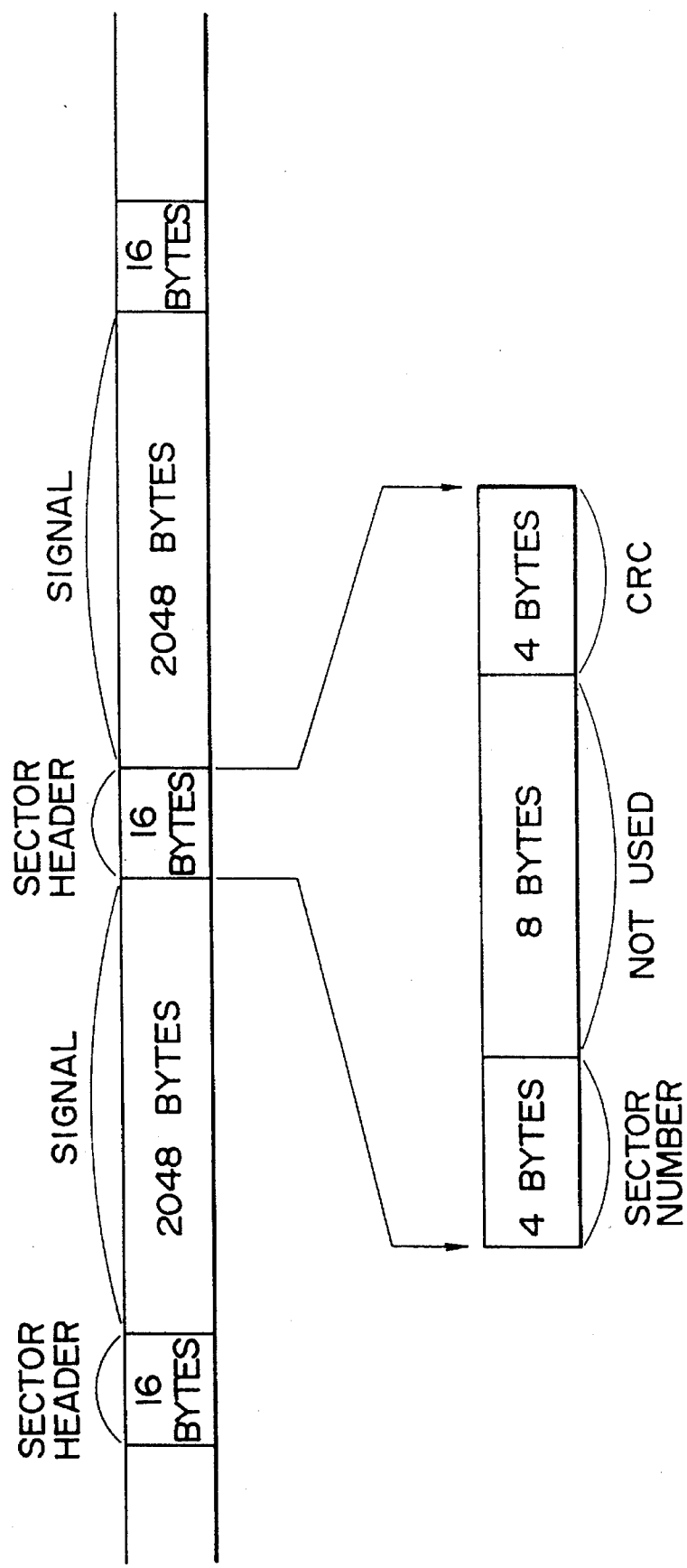
FIG. 10 shows the sector structure in the conventional examples shown in FIGS. 7 and 8.
Figure 16:
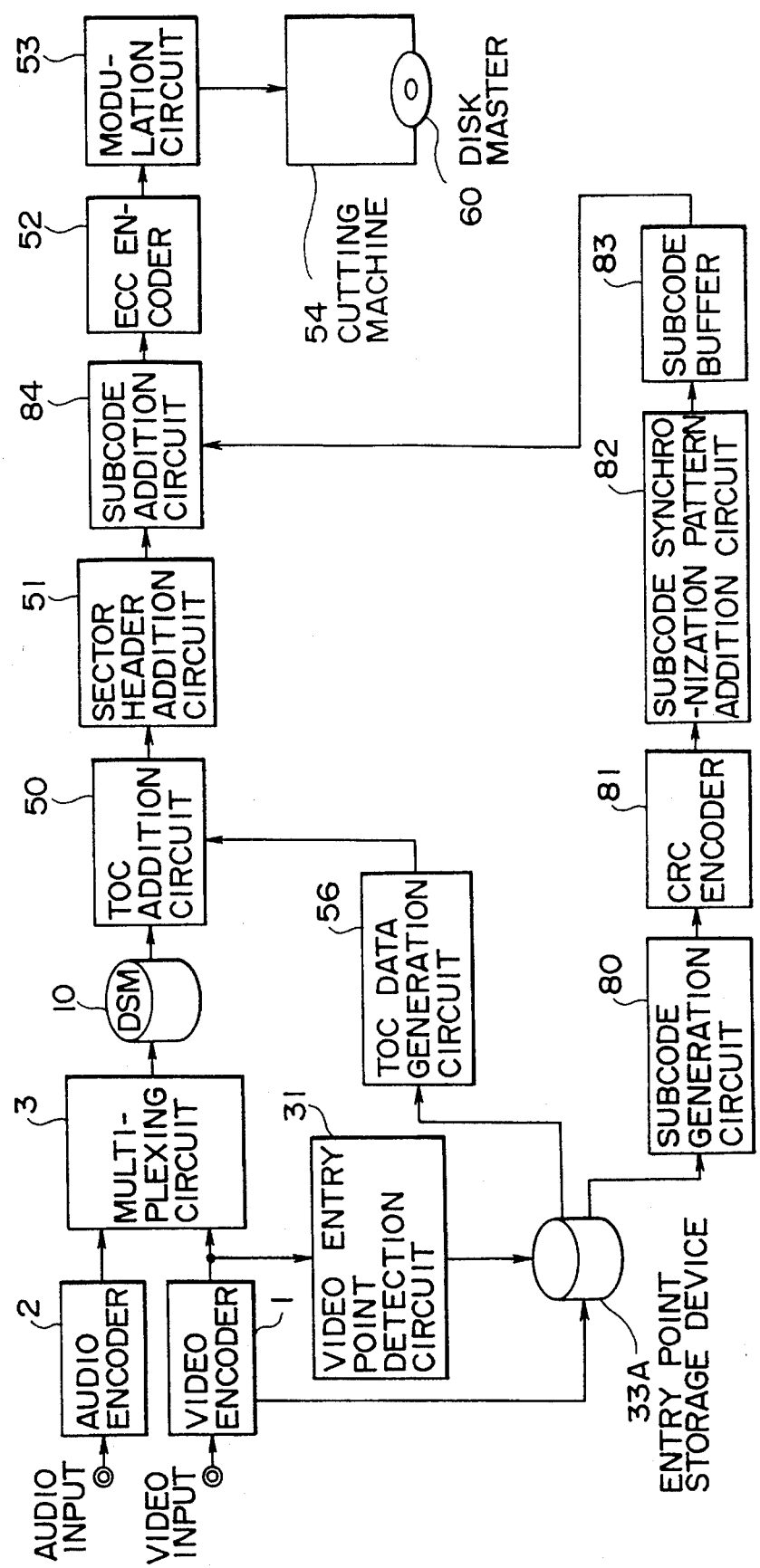
FIG. 16 is a block diagram showing the construction of another embodiment of a recording apparatus providing a recording that can be searched more rapidly than in the conventional example shown in FIG. 7.
Figure 17:
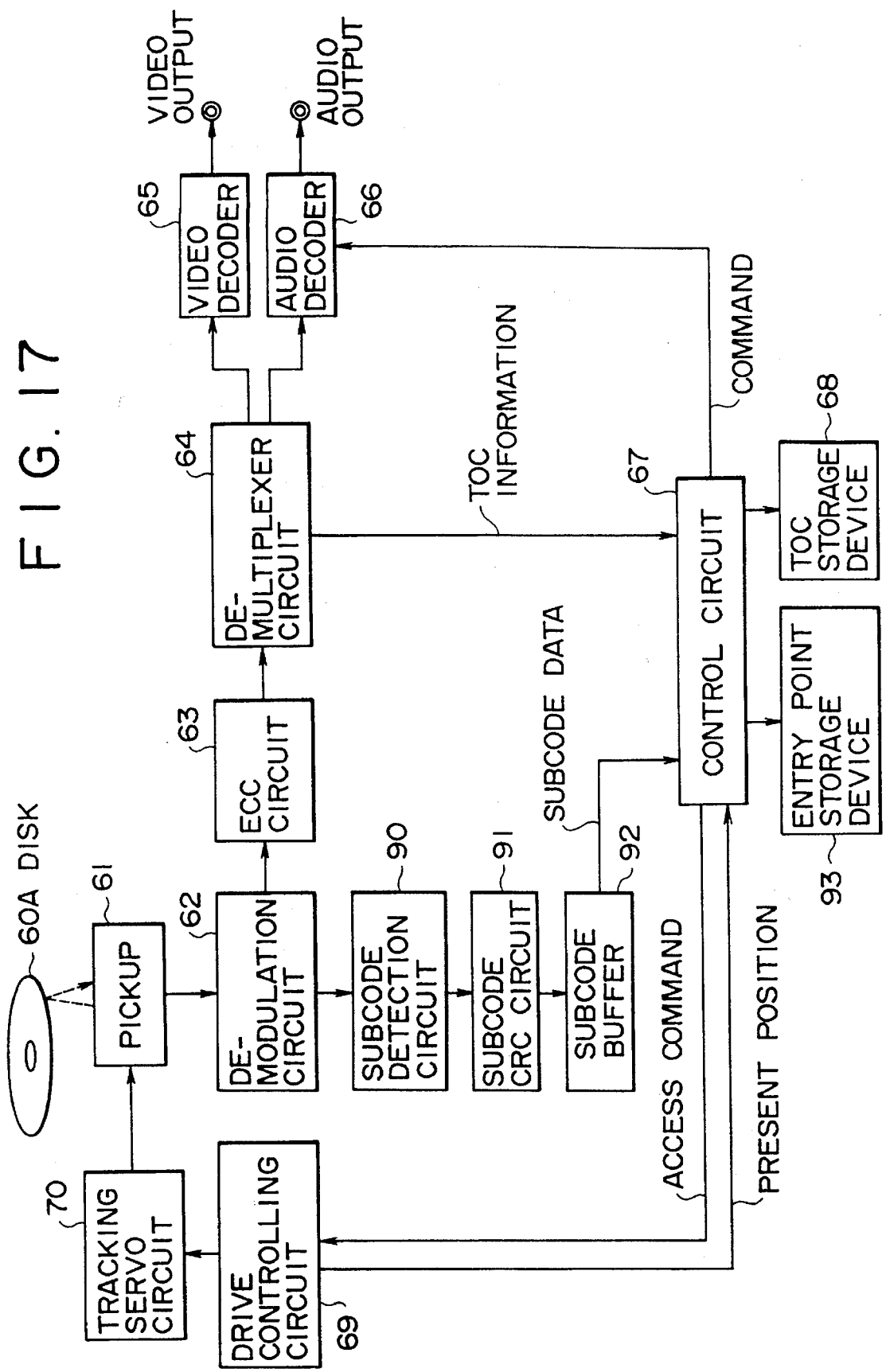
FIG. 17 is a block diagram showing the construction of another embodiment of a reproducing apparatus capable of rapidly searching a recording made by the apparatus shown in FIG. 16.

FIG. 16 is a block diagram showing the construction of another multiplexed signal recording apparatus for making a recording that can be searched more rapidly than a recording made by the conventional apparatus shown in FIG. 7. FIG. 17 is a block diagram showing the construction of a multiplexed signal reproducing apparatus that can search a recording made by the apparatus shown in FIG. 16 more rapidly than the conventional apparatus shown in FIG. 8. In FIGS. 16 and 17, components corresponding to those in the conventional apparatus shown in FIGS. 7 and 8 are indicated by the same reference characters.

In the recording apparatus shown in FIG. 16, entry points stored in the entry point storage device 33A are fed to the TOC generation circuit 56 and to the subcode generation circuit 80. The output of the subcode generation circuit 80 is fed to the CRC encoder 81. The output of the CRC encoder 81 is fed to the subcode synchronization pattern addition circuit 82, the output of which is fed to the subcode buffer 83. The subcode addition circuit 84 multiplexes the signal received from the sector header addition circuit 51 with data received from the subcode buffer 83, and feeds the multiplexed signal to the ECC encoder 52. The construction of the rest of the circuit is similar to the conventional apparatus shown in FIG. 7.

Operation of the recording apparatus shown in FIG. 16 will now be described. The video signal to be recorded and the audio signal to be recorded are compressed and multiplexed, the multiplexed signal is recorded on the DSM 10, and the entry points of the video signal are stored in the entry point storage device 33A in a manner similar to that in corresponding operations in the conventional recording apparatus show in FIG. 7. The entry points are reproduced from the entry point storage device 33A and are fed to the TOC generation circuit 56 to generate a TOC. The TOC is then added to the beginning of the multiplexed signal by the TOC addition circuit 50 in a manner similar to that in corresponding operations in the conventional recording apparatus shown in FIG. 7.

The recording apparatus shown in FIG. 16 differs from the conventional example shown in FIG. 7 in that entry points are additionally fed from the entry point storage device 33A to the subcode generation circuit 80. In the present embodiment, the subcode has the format shown in FIG. 19. A subcode synchronization pattern (2 bytes) is located at the beginning of the subcode. This is used so that the beginning of the subcode may be identified even if reading is started at an arbitrary sector. Following the subcode synchronization pattern is located the **_subcode_type. This indicates the type of subcode peculiar to the party identified by . A **_subcode_type of 0xFF indicates that the subcode contains entry point information. Next follows current_#_data_streams, current_#_video_streams, and current_#_audio_streams, which indicate the number of data streams, the number of video streams, and the number of audio steams multiplexed in the sector in which the subcode is included.

Following the current_#_audio_streams are successively located entry_point_-3, entry_point_-2, entry_point_-1, entry_ point_+1, entry_point_+2 and entry_point_+3. These indicate the relative positions of the three previous entry points and the three following entry points, in terms of the distance between the sector in which the current entry point appears and the sector in which the previous or following entry point appears on the disk 60, which will be recorded by the cutting machine 54 in a subsequent operation. Alternatively, the entry point positions may be defined in terms of absolute sector addresses on the disk 60.

Figure 18:
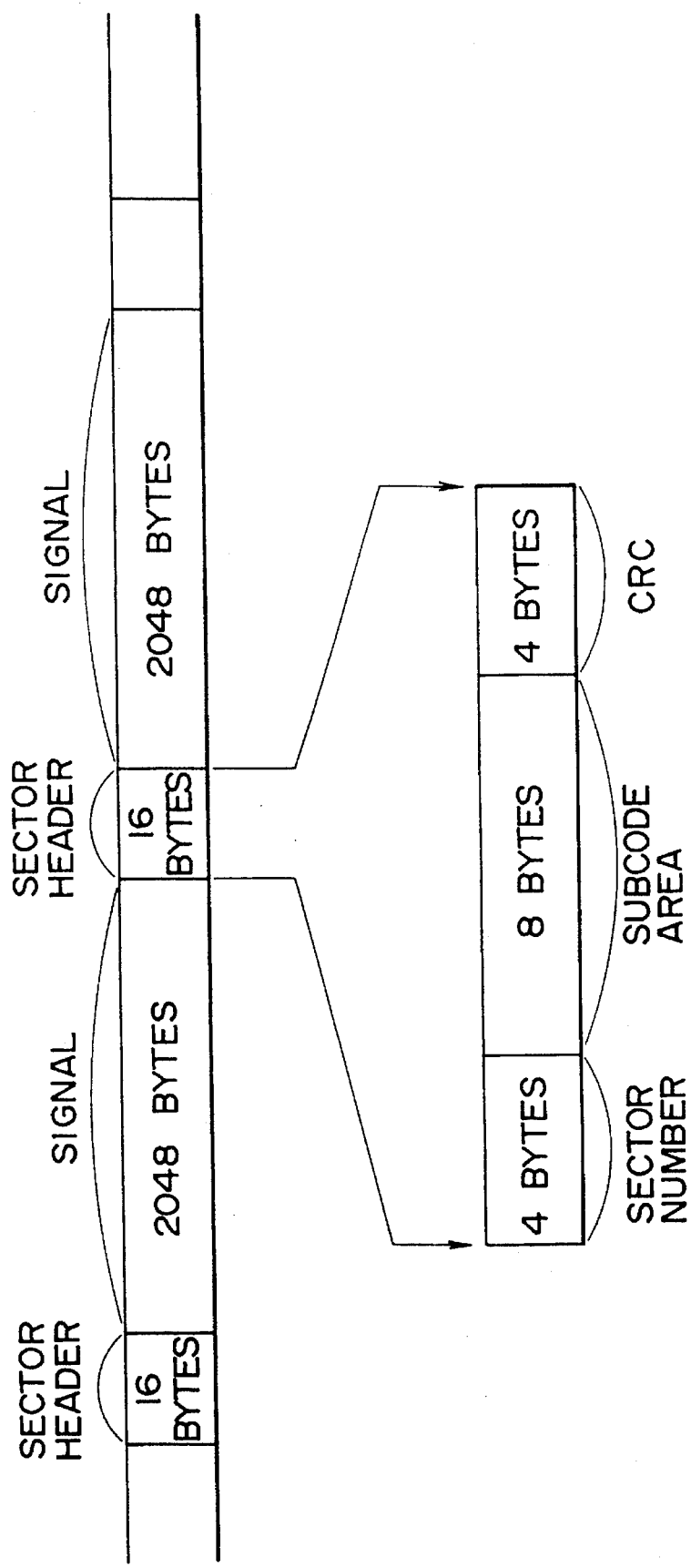
FIG. 18 shows the sector structure of the disk in the embodiments shown in FIGS. 16 and 17.

In the following description, it will be assumed that effective capacity of one sector is 2,048 bytes, and that the sector header, which includes the sector number of the sector, requires an additional 16 bytes, as shown in FIG. 18. The sector header addition circuit 51 divides the multiplexed signal it receives from the TOC addition circuit 51 into blocks of 2,048 bytes each, and adds a sector header of 16 bytes. The 8 bytes in the sector header that are not used in the conventional apparatus are used to accommodate the subcode.

The positions of the sectors in which the three previous entry points and the three following entry points appear are read out from the entry point storage device 33A and are delivered to the subcode generation circuit 80. The subcode generation circuit 80 generates the subcode shown in FIG. 19 using the entry points received from the entry point storage device 33A, and information from the controller and the user (not shown). The subcode is fed to the CRC encoder 81, which calculates a CRC code, adds the CRC code to the end of the subcode, and feeds the result to the subcode synchronization pattern addition circuit 82. The subcode synchronization pattern addition circuit 82 adds a synchronization pattern to the beginning of the subcode received from the CRC encoder 81, and feeds the resulting subcode to the subcode buffer 83.

The multiplexed signal read out from the DSM 10 via the TOC addition circuit 50 passes into the sector header addition circuit 51, which divides the multiplexed signal into blocks of 2,048 bytes and adds a sector header of 16 bytes. The sector header addition circuit 51 also writes the sector number in the sector header. The output of the sector header addition circuit 51 is fed to the subcode addition circuit 84, which reads 8 bytes of the subcode out of the subcode buffer 83, and writes them into the sector header in the subcode location therein. Since the subcode includes a total of 32 bytes and the subcode location in each sector header accommodates 8 bytes, each subcode is distributed among the sector headers of four sectors.

The output of the subcode addition circuit 84 is fed via the ECC encoder 52 and the modulation circuit 53 to the cutting machine 54, which records the resulting recording signal onto the optical disk master 60.

Figure 19:
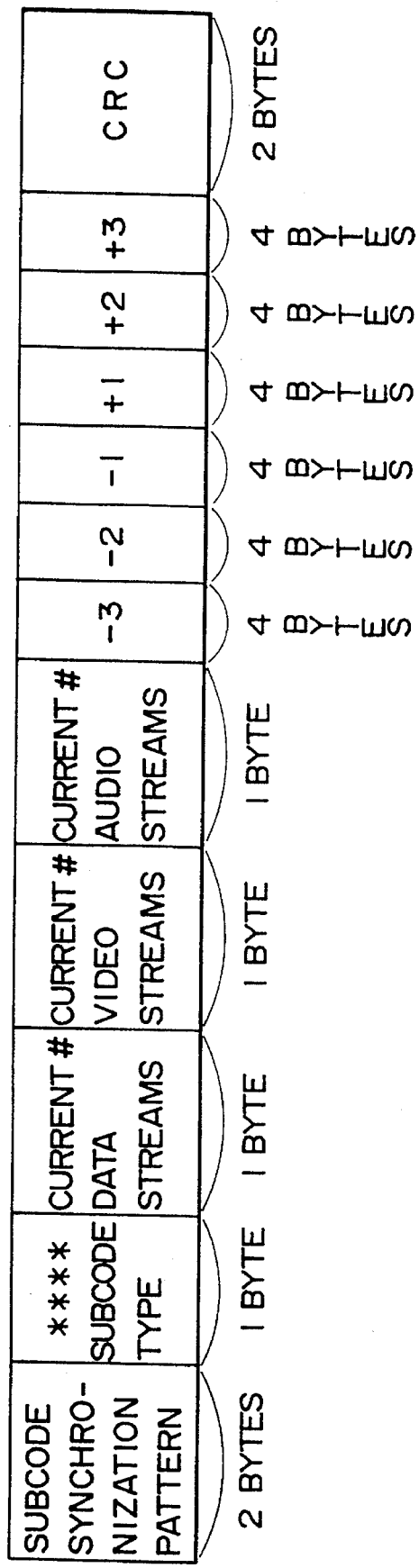
FIG. 19 shows the structure of the data in the subcode on the disk in the embodiments shown in FIGS. 16 and 17.

As shown in FIG. 19, the positions of the three previous entry points and the three following entry points are written in the locations entry_point_-3, entry_point_-2, entry_point_-1, entry_point_+1, entry_point_+2 and entry_point_+3, respectively in the subcode.

Finally, the apparatus for reproducing a disk recorded by the embodiment shown in FIG. 16 will be described with reference to FIG. 17. The signal demodulated by the demodulation circuit 62 is fed to the ECC circuit 63, and also to the subcode detection circuit 90. The output of the subcode detection circuit 90 is fed to the subcode CRC circuit 91, which performs error detection. A subcode for which no error has been detected is fed to the subcode buffer 92 in preparation for reading by the controller 67.

The controller 67 includes an entry point storage device 93 which stores entry points received from the subcode buffer 92 in readiness for when a search instruction is received from the user (not shown). The construction of the rest of the circuit is similar to that of the conventional apparatus shown in FIG. 8.

Operation of the disk reproducing apparatus shown in FIG. 17 will now be described. When the optical disk 60A is inserted into the apparatus, the controller 67 delivers a read first sector command to the drive control circuit 69. The drive control circuit 69 drives the pickup 61 via the tracking servo circuit 70 to the position of the first sector on the optical disk 60A and starts reproducing from the beginning of the first sector.

The pickup 61 illuminates the surface of the optical disk 60A with a laser beam, and reproduces the signal recorded on the disk using reflected light from the disk. The signal from the pickup 61 is fed into the demodulation circuit 62, which demodulates it. The demodulated signal is fed to the ECC circuit 63, which performs error detection and correction. The resulting error-corrected signal is fed to the demultiplexer circuit 64.

The TOC, which is recorded in the first sector of the optical disk 60A, is separated by the demultiplexer circuit 64 and fed to the controller 67. The controller 67 causes the TOC storage device 68 to store the TOC and causes the TOC to be displayed to the user (not shown) on a display (not shown).

The controller 67, after receiving a reproduce command from the user (not shown) delivers a command to the drive control circuit 69 to start operation. The drive control circuit 69 drives the pickup 61 via the tracking servo circuit 70 to start reproducing from the position on the disk 60 indicated by the user. At the same time, the drive control circuit 69 delivers a command to the video decoder 65 and the audio decoder 66 to prepare to decode input signals.

After reading the TOC, the pickup 61 illuminates the surface of the optical disk 60A with a laser beam, and reproduces the signal recorded on the disk using reflected light from the disk. The signal from the pickup 61 is fed to the demodulation circuit 62, which performs demodulation. The demodulated signal is fed to the ECC circuit 63, which performs error detection and correction. The resulting error-corrected signal is fed to the demultiplexer circuit 64.

The video signal separated by the demultiplexer 64 is fed to the video decoder 65, and the audio signal is fed to the audio decoder 66. The video signal and the audio signal, which are compressed, are expanded by the video decoder 65 and the audio decoder 66, respectively, to provide a decompressed digital video signal and a decompressed digital audio signal, respectively.

The signal from the demodulation circuit 62 is also fed to the subcode detection circuit 90. The subcode detection circuit 90 extracts the portions of subcode from the sector headers of four sectors. In this example, 8 bytes of subcode are extracted from each sector header. The subcode synchronization pattern is detected in the subcode extracted from plural sector headers, and the subcode is fed into the subcode CRC circuit 91 starting with the beginning of the subcode. The CRC circuit 91 determines from the subcode it receives and CRC data therein whether there is an error in the subcode. When no error is found, the subcode is fed to the subcode buffer 92.

The controller 67 reads the entry points from the subcode buffer 92 and supplies them to the entry point storage device 93, which stores them. Since the drive control circuit supplies the current read position to the controller 92, the controller 67 can cause the positions of the entry points and contents of the entry points to be stored in a corresponding relationship to each other.

Operation of the multiplexed signal reproduction apparatus shown in FIG. 17 during a search now be described. When the user (not shown) enters a search command, the controller 67 instructs the video decoder 65 and the audio decoder 66 to enter into search mode. The controller 67 also reads the current read position from the output of the drive control circuit 69, and reads the relative positions of entry points near the current read position from the entry point storage device 93.

After the controller determines the position of the entry point from the entry points read from the entry point storage device, it sends a search instruction to the drive control circuit 69. The drive control circuit 69 drives the tracking servo circuit 70 to move the pickup 61 at high speed to the position of the entry point determined by the controller.

After the movement is completed, the pickup 61 starts reproducing from the entry point and feeds the reproduced signal to the demodulation circuit 62. The demodulated signal is supplied to the video decoder 65, via the ECC circuit 63 and the demultiplexer circuit 64, and the subcode portion is separated from the demodulated signal by the subcode detection circuit 90, the subcode CRC circuit 91, and the subcode buffer 92. The resulting subcode is fed to the controller 67 for use.

Since pickup 61 staffs reproduction at an entry point, the first picture of the video signal supplied to the video decoder 65 is an I-picture. The video decoder 65 immediately decodes the I-picture, and feeds it to the video output. The audio decoder 66 is muted in search mode.

Since the positions of the previous three entry points and the following three entry points relative to the current position of the pickup are recorded in the subcode reproduced from the current read position, the controller 67 uses the reproduced position information to cause the pickup to jump to next entry point, and repeats the sequence of jumping to the next entry point and reproducing the I-picture from the disk starting at the next entry point. The results in a rapid succession of I-pictures being reproduced from the disk.

The controller 67 causes the pickup 61 to jump to a more distant entry point when the rate of search is high, and causes the pickup 61 to jump to a closer entry point when the rate of search is low. Since the relative positions of three entry points in each of the forward and the reverse directions are stored, three or more variations in search rate can be obtained by selecting different combinations of entry points.

The apparatus and method for providing rapidly-changing pictures during a high-speed search according to the present invention will now be described. The apparatus of the present invention has the same block diagram as the conventional multiplexed data reproducing apparatus shown in FIG. 2. Alternatively, the apparatus according to the invention can have the same block diagram as the conventional reproducing apparatus shown in FIG. 8, or the reproducing apparatus with higher-speed search shown in FIGS. 11 and 17. In the reproducing apparatus according to the invention, the control circuit, such as the control circuit 24 in FIG. 2, is modified relative to the apparatus described above to carry out the method according to the invention. The invention will now be described with reference to FIG. 2 on the understanding that the control circuits in the reproducing apparatus shown in FIGS. 8, 12, and 17 can also be used.

In response to a search command, the main control apparatus (not shown) instructs the control circuit 24, the video decoder 25, and the audio decoder 26 to enter into search mode. The audio decoder 26 muted in search mode.

In search mode, the control circuit 24 instructs the DSM 10 to move the read position on the disk forwards or backwards. While the amount of movement of the read position depends upon the search rate, the compression ratio, etc.; generally, the amount of movement increases as the search rate increases and as the compression ratio increases. When the read position has moved to the predetermined position, the control circuit 24 causes the multiplexed signal recorded on the DSM 10 to be reproduced. The reproduced signal is fed to the separation circuit 21, where the header separation circuit 22 separates the video signal from the multiplexed signal and supplies it to the video decoder 25.

In the conventional apparatus, the control circuit causes the read position to move to the next predetermined position immediately after the video signal of one I-picture has been reproduced from the DSM 10. The modified control circuit in the apparatus according to the invention, instead of changing the read position after just one I-picture has been reproduced from the DSM 10, briefly delays the change in the read position. This allows several pictures following the I-picture to be reproduced from the DSM 10. After reproducing the several pictures, the control circuit moves the read position to the next entry point. Thus, one I-picture, one P-picture, and several B-pictures are read at each entry point. As a result, instead of as few as two different pictures being reproduced per second, eight or more pictures can be reproduced per second with a relatively small effect on the rate of search.

In this example, it will be assumed that if the pictures in one GOP is ¦BBIBBPBBPBBPBBP¦. Then, to decode the video signal representing the pictures, the order is changed to ¦IBBPBBPBBPBBPBB¦, as shown in FIG. 20. The bit allocation shown in FIG. 20 conforms to the bit allocation to the different types of pictures described above. In this example of the operation of the embodiment of the present invention, the modified control circuit first causes the DSM 10 to reproduce the first-appearing I-picture at the entry point. Then, unlike the conventional embodiment, the modified control circuit causes the DSM 10 to reproduce, for example, the two B-pictures, the one P-picture, and the two further B pictures immediately following the I-picture. The video decoder 25 decodes these pictures and provides the resulting non-compressed signal to the video output as an output signal. Since the control circuit causes the DSM 10 to reproduce sufficient signal for the video decoder 25 to be able to decode not only the I-picture, but also the following two B-pictures and the following P-picture, a sequence of four moving pictures, for example, can be provided from each read position on the DSM 10. Note, however, that, because the I-picture belonging to the first two B-pictures of the GOP is not reproduced from the DSM 10, the first two B-pictures cannot also be decoded.

When the invention is applied, for example, to the apparatus shown in FIG. 12, the location on the DSM 10 of each I-picture is known because of location information included in a private packet located ahead of another I-picture, or by any other means, and the DSM 10 searches for I-pictures using such information, then, there is time to reproduce, for example, a sequence of six consecutive pictures in a manner similar to that described above at each read position.

The search time of the present invention described above will now be estimated. When the DSM 10 is a CD-ROM drive, the search time is a sum of the following parameters.

Head seek time: $\alpha$(depends upon the mechanical structure)

Servo settling time: $\beta$(depends upon the servo circuit parameters)

Maximum latency: about 300 milliseconds at the outer circumference of the CD-ROM Read time: about 150 milliseconds for one I-picture, plus an additional 75 milliseconds for the following P-picture, plus an additional 20 milliseconds for four B-pictures.

The head seek time $\alpha$ and the servo settling time $\beta$ are very short compared with the maximum latency and the read time, and can therefore be ignored. The time required to jump to the next I-picture, to read the I-picture, and additionally to read the following B- and P-pictures is therefore given by the sum of the maximum latency and the read time. The read time for the six I, B, B, P, B and B pictures shown is $(150+75+(5\times4))/1,000=245$ milliseconds. Therefore, the time required to jump to the next I-picture, to read the I-picture, and additionally to read the following B- and P-pictures is estimated to be a maximum of about 545 milliseconds.

As a result, in the present embodiment, a sequence of about 8 pictures or so can be obtained each second. This significantly reduces the psychological waiting time for the user.

It is to be noted that, while, in the present embodiment, the signal read out after a search is described being 6 consecutive pictures, beginning with an I-picture, a similar effect can be obtained by reading out two or more pictures including an I-picture. Also an algorithm wherein a predetermined amount of signal is read into the video signal buffer may be available.

Although illustrative embodiments of the invention have been described herein in detail, it is to be understood that the invention is not limited to the precise embodiments described, and that various modifications may be practiced within the scope of the invention defined by the appended claims.

We claim:

1. A method of reproducing pictures from a recording medium during a high-speed search of the recording medium, each picture being stored in the recording medium in the form of a coded signal, the coded signal being coded in one of an intra-picture coding mode and an inter-picture coding mode, the coded signal of a picture coded in the intra-picture coding mode being an I-picture, the coded signal of a picture coded in the inter-picture coding mode with only forward prediction being a P-picture, and the coded signal of a picture coded in the inter-picture coding mode with bidirectional prediction being a B-picture, the I-pictures being stored at random intervals throughout the recording medium, the pictures being reproduced from the recording medium at a read position on the recording medium, the method comprising steps of:

reproducing a first I-picture from the recording medium at a first read position, and additionally reproducing at least one additional picture from the recording medium at the first read position, the at least one additional picture being one of a B-picture and a P-picture immediately following the first I-picture in the recording medium;

following reproduction of the at least one additional picture, rapidly changing the read position on the recording medium to a second read position at which a second I-picture is stored, the read position being rapidly changed to the second read position by skipping reproduction of P-pictures and B-pictures between the at least one additional picture and the second I-picture; and decoding the I-picture and the at least one additional picture reproduced in the reproducing step to provide pictures of an output signal.

2. The method of claim 1, wherein, in the decoding step, a B-picture immediately following the first I-picture is decoded.

3. The method of claim 1, wherein:

in the reproducing step, two B-pictures and a P-picture are reproduced immediately following the I-picture as the at least one additional picture; and in the decoding step, the two B-pictures and the one P-picture are decoded after the I-picture has been decoded.

4. The method of claim 3, wherein, in the decoding step, the I-picture is a reference picture for decoding the P-picture, and the I-picture and the P-pictures are reference pictures for decoding the B-pictures.

5. The method of claim 1, additionally comprising steps of:

reproducing the second I-picture and at least one further additional picture from the recording medium at the second read position following the step of rapidly changing the read position on the recording medium to the second read position; and decoding the second I-picture and the at least one further additional picture to provide further pictures of the output signal.

6. The method of claim 5, wherein:

the steps of rapidly changing the read position on the recording medium to the second read position and reproducing the second I-picture and at least one further additional picture from the recording medium at the second read position execute in an elapsed time;

in the step of reproducing the first I-picture and at least one additional picture from the recording medium, at least three additional pictures are reproduced from the recording medium as the at least one additional picture;

in the step of decoding the first I-picture and at least one additional picture, at least four pictures of the output signal are provided by decoding the first I-picture and the at least three additional pictures; and the method additionally comprises a step of displaying, in response to the at least four pictures of the output signal, at least four different pictures in a time corresponding to the elapsed time.

7. The method of claim 1, wherein:

each I-picture stored in the recording medium is immediately preceded by an I-picture pointer, the first I-picture being immediately preceded by a first I-picture pointer;

in the reproducing step at the first read position, the first I-picture pointer is additionally reproduced from the recording medium;

in the step of rapidly changing the read position to the second read position, the second read position is identified by position information in the first I-picture pointer additionally reproduced in the reproducing step; and the method additionally includes a step of
extracting the position information indicating the second read position from the first I-picture pointer additionally reproduced in the reproducing step.

8. The method of claim 7, wherein:

the pictures are stored in the recording medium in packets accommodated in packs;

the first I-picture pointer is stored in the recording medium in an entry packet preceding the packet of the first I-picture;

the reproducing step at the first read position includes steps of:

reproducing the pack including the entry packet from the recording medium, demultiplexing the pack to provide the entry packet and the picture, and extracting the first I-picture pointer from the entry packet.

9. The method of claim 7, wherein:

the pictures are stored in the recording medium in sectors, each sector having a sector header;

the sector header of a sector including the first I-picture includes the first I-picture pointer; and the reproducing step at the first read position includes steps of:

reproducing the sector including the sector header from the recording medium, and extracting the first I-picture pointer from the sector header.

10. The method of claim 1, wherein:

in the reproducing step at the first read position, only two B-pictures and one P-picture are reproduced as the at least one additional picture; and in the decoding step, the first I-picture is decoded to provide a decoded first I-picture, the P-picture reproduced in the step of reproducing is decoded to provide a decoded P-picture using the decoded first I-picture as a reference picture, and the B-pictures are decoded using the decoded first I-picture and the decoded P-picture as reference pictures to provide a sequence of four pictures of the output signal.

11. Apparatus for reproducing pictures from a recording medium during a high-speed search of the recording medium, each picture being stored in the recording medium in the form of a coded signal, the coded signal being coded in one of an intra-picture coding mode and an inter-picture coding mode, the coded signal of a picture coded in the intra-picture coding mode being an I-picture, the coded signal of a picture coded in the inter-picture coding mode with only forward prediction being a P-picture, and the coded signal of a picture coded in the inter-picture coding mode with bidirectional prediction being a B-picture, the I-pictures being stored at random intervals throughout the recording medium, the apparatus comprising:

reproducing means for reproducing pictures from a read position on the recording medium to provide a playback signal for each picture;

positioning means for determining the read position wherefrom the reproducing means reproduces from the recording medium;

control means for controlling the reproducing means and the positioning means to reproduce the pictures by causing:

the reproducing means to reproduce a first I-picture from the recording medium at a first read position, and additionally to reproduce at least one additional picture from the recording medium at the first read position, the at least one additional picture being one of a B-picture and a P-picture immediately following the first I-picture in the recording medium, and the positioning means to rapidly change the read position to a second read position on the recording medium following reproduction of the at least one additional picture, a second I-picture being stored at the second read position, the positioning means rapidly changing the read position by skipping reproduction of P-pictures and B-pictures between the at least one additional picture and the second I-picture; and decoding means for decoding the playback signal of the I-picture and the at least one additional picture to provide pictures of an output signal.

12. The apparatus of claim 11, wherein, the decoding means decodes a B-picture immediately following the first I-picture in the recording medium.

13. The apparatus of claim 11, wherein:

the control means causes the reproducing means to reproduce two B-pictures and a P-picture immediately following the I-picture as the at least one additional picture; and the decoding means decodes the two B-pictures and the one P-picture after the I-picture.

14. The apparatus of claim 13, wherein the decoding means is additionally for:

decoding the P-picture using the I-picture as a reference picture; and decoding the B-pictures using the I-picture and the P-picture as reference pictures.

15. The apparatus of claim 11, wherein:

the control means is for controlling the reproducing means and the positioning means to reproduce pictures by additionally causing:

the reproducing means to reproduce the second I-picture and at least one further additional picture from the recording medium at the second read position; and the decoding means is additionally for decoding the playback signals of the second I-picture and the at least one further additional picture to provide further pictures of the output signal.

16. The apparatus of claim 15, wherein:

the positioning means requires a first elapsed time to change the read position from the first read position to the second read position, and the reproducing means requires a second elapsed time to reproduce the first I-picture and the at least one further additional picture from the recording medium at the second read position;

three additional pictures are reproduced from the recording medium as the at least one additional picture; and the decoding means decodes the playback signals of the first I-picture and the three additional pictures reproduced by the reproducing means from the recording medium at the first read position in a time less than the sum of the first elapsed time and the second elapsed time.

17. The apparatus of claim 16, wherein:

each I-picture stored in the recording medium is preceded by an I-picture pointer, the first I-picture being preceded by a first I-picture pointer;

the reproducing means reproduces the first I-picture pointer from the recording medium in addition to reproducing the first I-picture from the recording medium;

the control means causes the positioning means to rapidly change the read position to the second read position identified by position information in the first I-picture pointer reproduced by the reproducing means; and the decoding means additionally includes extracting means for extracting the position information indicating the second read position from the first I-picture pointer reproduced by the reproducing means.

18. The apparatus of claim 17, wherein:

the pictures are stored in the recording medium in packets accommodated in packs;

the first I-picture pointer is stored in the recording medium in an entry packet preceding the packet of the first I-picture;

the reproducing means reproduces the first I-picture from the recording medium at the first read position by reproducing a pack including the entry packet from the recording medium; and the apparatus additionally includes:
demultiplexing means for demultiplexing the pack to provide the entry packet and the picture, and
means for extracting the first I-picture pointer from the entry packet.

19. The apparatus of claim 17, wherein:

the pictures are stored in the recording medium in sectors, each sector having a sector header;

the sector header of a sector including the first I-picture includes the first I-picture pointer; and the reproducing means reproduces the first I-picture from the recording medium at the first read position by reproducing the sector including the sector header from the recording medium; and the apparatus additionally includes means for extracting the first I-picture pointer from the sector header.

20. The apparatus of claim 11, wherein:

the control means causes the reproducing means to reproduce from the recording medium at the first read position only two B-pictures, and one P-picture as the at least one additional picture; and the decoding means decodes the playback signal of the first I-picture to provide a decoded first I-picture, decodes the playback signal of the P-picture to provide a decoded P-picture using the decoded first I-picture as a reference picture, and decodes the playback signal of the B-pictures using the decoded first I-picture and the decoded P-picture as reference pictures to provide a sequence of four pictures of the output signal.

* * * * *